(12) United States Patent
Johannesson et al.

(10) Patent No.: US 10,155,585 B2
(45) Date of Patent: Dec. 18, 2018

(54) FOLDING PROPELLERS SYSTEM

(71) Applicant: AERYON LABS INC., Waterloo (CA)

(72) Inventors: Glen Johannesson, Waterloo (CA);
David Kroetsch, Waterloo (CA);
Michael Peasgood, Waterloo (CA);
Stephen Marchetti, Trenton (CA)

(73) Assignee: AERYON LABS INC., Waterloo (CA)

( * ) Notice: Subject to any disclaimer, the term of this patent is extended or adjusted under 35 U.S.C. 154(b) by 511 days.

(21) Appl. No.: 14/775,793

(22) PCT Filed: Mar. 13, 2014

(86) PCT No.: PCT/IB2014/059759
§ 371 (c)(1),
(2) Date: Sep. 14, 2015

(87) PCT Pub. No.: WO2014/141154
PCT Pub. Date: Sep. 18, 2014

(65) Prior Publication Data
US 2016/0001879 A1    Jan. 7, 2016

Related U.S. Application Data

(60) Provisional application No. 61/783,692, filed on Mar. 14, 2013.

(51) Int. Cl.
*B64C 27/50* (2006.01)
*B64C 39/02* (2006.01)

(52) U.S. Cl.
CPC ............ *B64C 27/50* (2013.01); *B64C 39/024* (2013.01); *B64C 2201/027* (2013.01); *B64C 2201/108* (2013.01); *B64C 2201/20* (2013.01)

(58) Field of Classification Search
CPC ............ B64C 39/024; B64C 2201/027; B64C 2201/108; B64C 2201/20; B64C 27/50
USPC .............................. 244/17.23; 416/143, 142
See application file for complete search history.

(56) References Cited

U.S. PATENT DOCUMENTS

| | | | |
|---|---|---|---|
| 866,369 A * | 9/1907 | Learnard | B63H 1/24 |
| | | | 416/131 |
| D465,196 S * | 11/2002 | Dammar | D12/328 |
| 2006/0231677 A1 | 10/2006 | Zimet et al. | |
| 2011/0158809 A1 | 6/2011 | Luo | |

FOREIGN PATENT DOCUMENTS

| | | |
|---|---|---|
| EP | 2189201 | 5/2010 |
| WO | 2011058447 | 5/2011 |

OTHER PUBLICATIONS

"Spreading Wings S800 EVO User Manual", Jul. 2, 2013, Revision V 1.00, 25 pages, DJI Innovations, Retrieved from the Internet:<URL: http://download.dji-innovations.com/downloads/s800evo/en/S800_EVO_User_Manualv1.00_en.pdf>.
PCT/IB2014/059759 International Search Report, dated Jul. 15, 2014.

* cited by examiner

*Primary Examiner* — Richard Edgar
(74) *Attorney, Agent, or Firm* — Norton Rose Fulbright Canada LLP; Niall Cooney

(57) ABSTRACT

Folding propeller system for safe packing and shipping, and easy deployment.

39 Claims, 10 Drawing Sheets

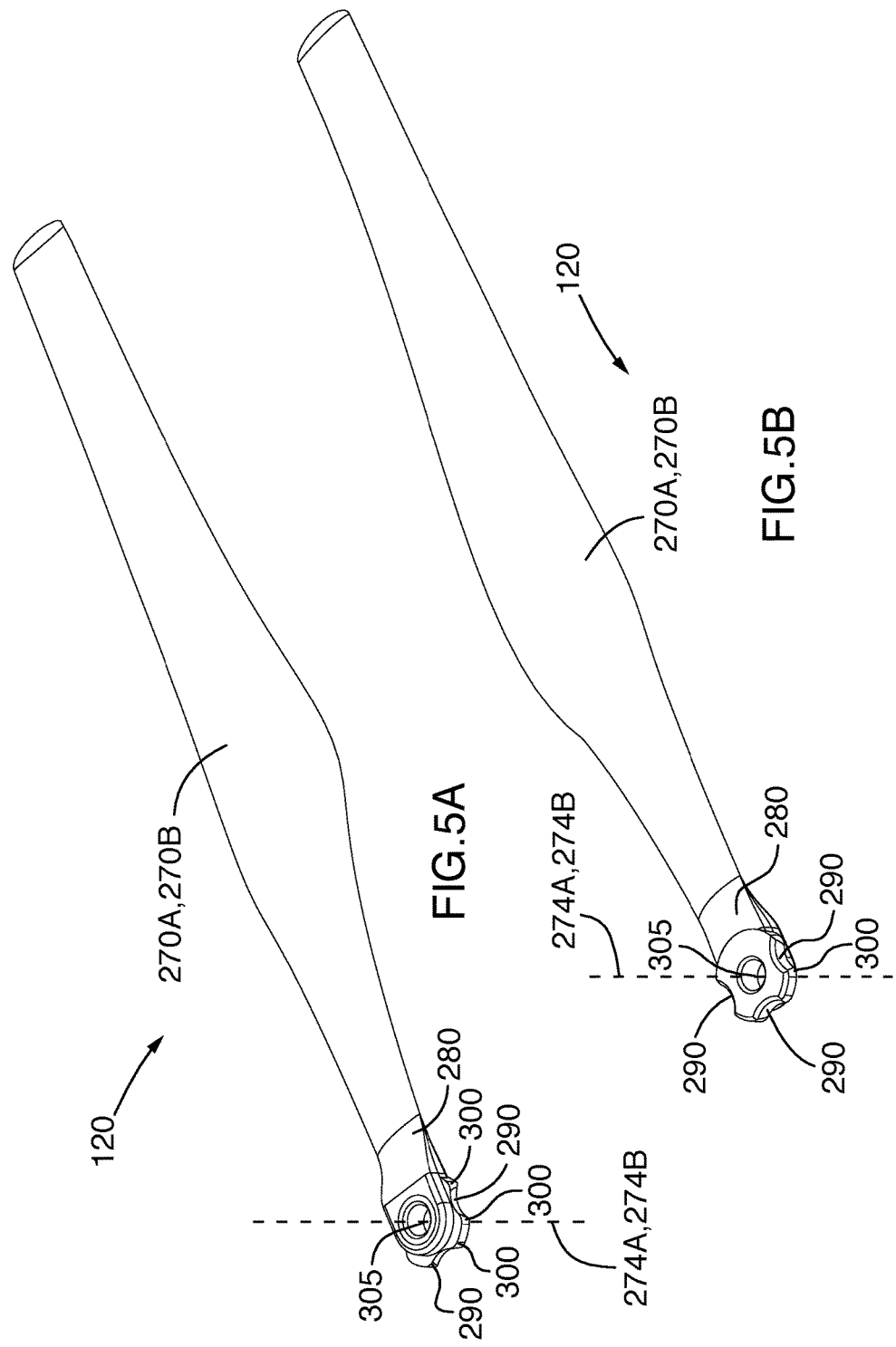

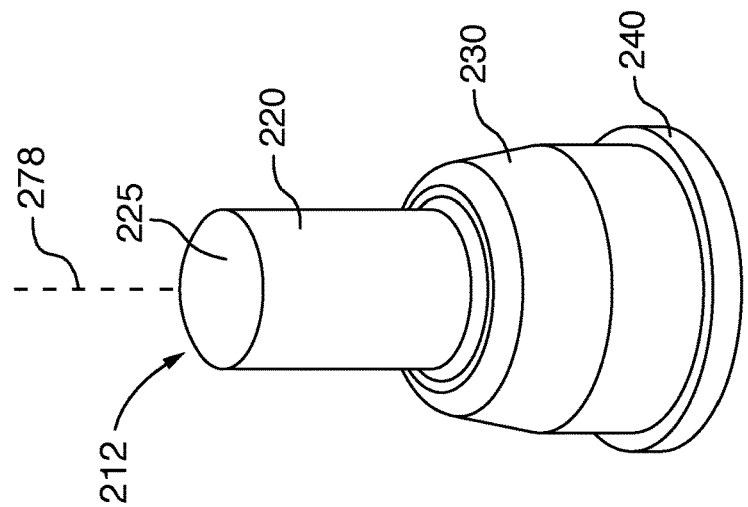
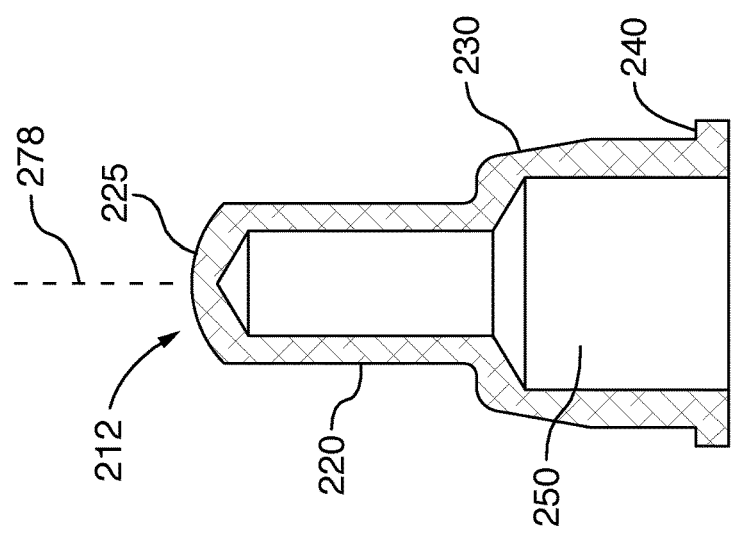
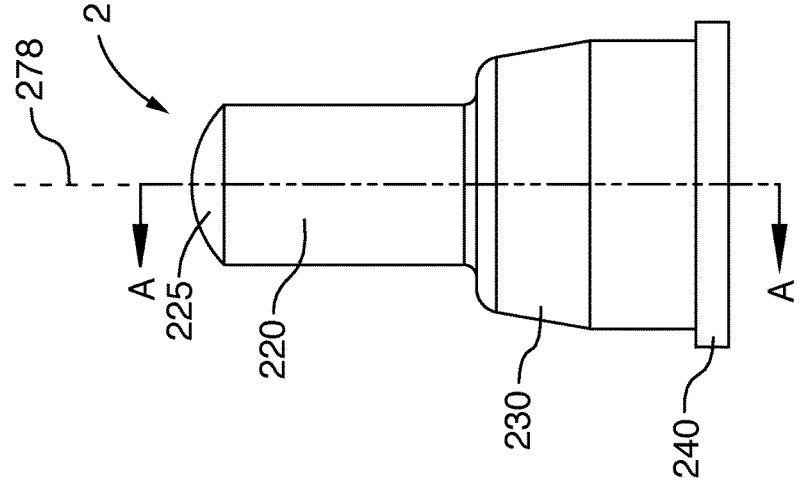

FOLDING PROPELLERS SYSTEM

CROSS REFERENCES TO RELATED APPLICATIONS

This application filed under 35 U.S.C § 371 is a national phase application of International Application Serial Number PCT/IB2014/059759 filed Mar. 13, 2014, which claims priority to U.S. Provisional Application 61/783,692, filed Mar. 14, 2013.

TECHNICAL FIELD

Aspects generally related to propellers.

SUMMARY

Problems associated with propellers were researched. After much study, an understanding of the problem and its solution has been identified, which is stated below.

Often, there is a need to transport or ship hovering unmanned aerial vehicles (hereafter referred to as HUAVs). Unlike with large aircraft, where a plane may be flown to wherever it is needed, HUAVs traditionally are stowed or packed for transport to where they are needed. HUAVs are generally bulky and fragile to transport in their normal, flight-ready state. The propellers, in particular, may be hit, twisted or otherwise damaged, because they extend beyond any other edges on the propeller arms. This creates maintenance hassles and expenses for the HUAV user, is a warranty problem for the manufacturer, and may prevent timely deployment of the HUAV if the damage is only discovered when the HUAV is to be deployed.

One solution is to implement detachable propellers or propeller assemblies. Three problems with this solution are that (a) the propellers are either difficult and time-consuming to re-assemble in the field, potentially requiring tools, or are only weakly and insecurely held to the motor and HUAV, (b) the propellers must be stowed and transported independent of the HUAV, and may be lost in shipping, and (c) the propellers, if they are keyed to particular arms, must be oriented correctly and mounted on the correct arms, which may be an error-prone operation in a high-pressure deployment situation.

Another possible solution is to surround the propellers with protective shrouds. There are problems with this solution as well. Specifically, the shrouds add weight, which reduces the HUAV's flight time for a given amount of fuel or battery; the shrouds reduce the HUAV's aerodynamic performance and agility; the shrouds add bulk, making the HUAV more difficult to pack and transport; the shrouds add manufacturing and materials cost; and the shrouds are additional parts which may be damaged, increasing maintenance and warranty costs. Clearly, they are a solution only when there is no time or patience to engineer a proper solution.

The inventors have provided a folding propeller system for a hovering unmanned aerial vehicle (HUAV). The term "propeller" is used throughout this document to describe propellers, rotors and hybrid prop-rotors, and the use of the term "propeller" should not be taken to narrow the scope of the invention.

In one aspect of the invention, there is provided a novel and innovative hinge mechanism which allows the propeller assembly to be easily stowed for safe transport.

In another aspect of the invention, there is provided a novel and innovative engagement mechanism which allows the hinge mechanism to operate easily, smoothly and reliably in spite of wear over time.

In another aspect, the hinge mechanism, engagement mechanism and propeller assembly may all be incorporated into a hovering unmanned aerial vehicle.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology, terminology, and headings employed herein are for the purpose of description and should not be regarded as limiting.

In order to mitigate, at least in part, the problem(s) identified above, in accordance with an aspect, there is provided a vehicle 100 including a rotatable-propeller assembly 120 including rotatable propeller blades 270A, 270B. The vehicle 100 also includes a blade-lock assembly 212 cooperative with the rotatable propeller blades 270A, 270B. The blade-lock assembly 212 is configured to selectively lockably fixedly connect the rotatable propeller blades 270A, 270B together by application of a clamping force 914 to the rotatable propeller blades 270A, 270B. The blade-lock assembly 212 is also configured to selectively lockably disconnect the rotatable propeller blades 270A, 270B from each other by removal of the clamping force 914 from the rotatable propeller blades 270A, 270B.

In order to mitigate, at least in part, the problem(s) identified above, in accordance with an aspect, there is provided a method of the vehicle 100. The method includes selectively lockably fixedly connecting rotatable propeller blades 270A, 270B of a rotatable-propeller assembly 120 together by application of a clamping force 914 to the rotatable propeller blades 270A, 270B. The method also includes selectively lockably disconnecting the rotatable propeller blades 270A, 270B from each other by removal of the clamping force 914 from the rotatable propeller blades 270A, 270B. It will be appreciated that the method may include additional operations and/or steps that are implied from or expressed in the description provided below as would be appreciated by persons of skill in the art.

In order to mitigate, at least in part, the problem(s) identified above, in accordance with an aspect, there is provided other aspects as identified in the claims.

Other aspects and features of the non-limiting embodiments may now become apparent to those skilled in the art upon review of the following detailed description of the non-limiting embodiments with the accompanying drawings.

DETAILED DESCRIPTION OF THE DRAWINGS

The non-limiting embodiments may be more fully appreciated by reference to the following detailed description of the non-limiting embodiments when taken in conjunction with the accompanying drawings, in which:

FIG. 5A (SHEET 5/9) is an isometric view of the first side of an embodiment of the propeller assembly 120 of FIG. 1;

FIG. 5B (SHEET 5/9) is an isometric view of the second side of an embodiment of the propeller assembly 120 of FIG. 1;

FIG. 7A (SHEET 7/9) is a side view of an embodiment of a locking pin 220 for use with the propeller assembly 120 of FIG. 1;

FIG. 7B (SHEET 7/9) is a cross-section view of an embodiment of the locking pin 220 of FIG. 7A, sectioned as per the line A-A in FIG. 7A;

FIG. 7C (SHEET 7/9) is an isometric view of an embodiment of a locking pin 220 for use with the propeller assembly 120 of FIG. 1;

Figure 1:
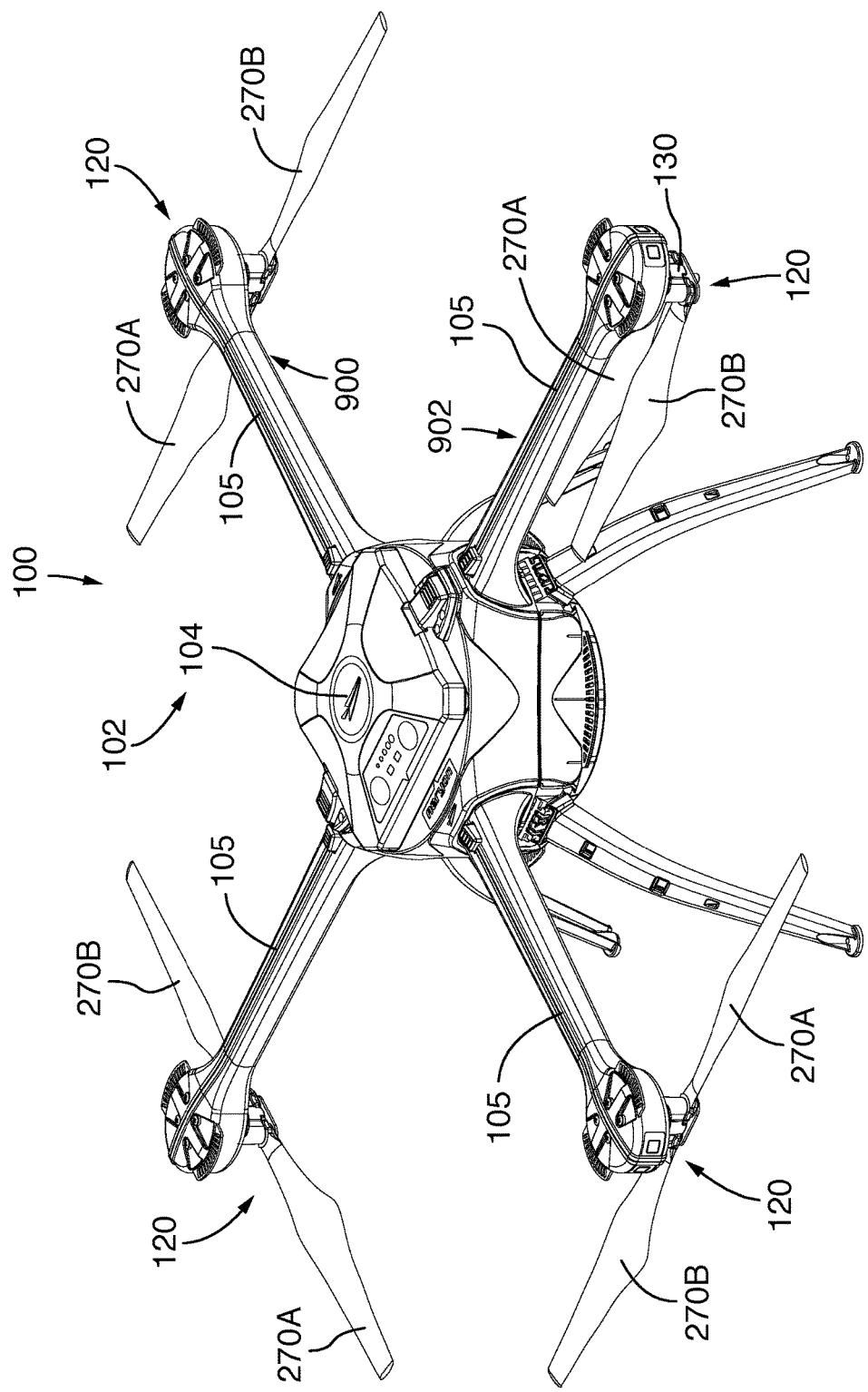
FIG. 1 (SHEET 1/9) is an isometric view of an embodiment of four instances of a propeller assembly 120 (three instances placed in an extended state, and one instance placed in a folded state) as part of an embodiment of a hovering unmanned aerial vehicle 102, hereafter referred to as the HUAV 102.
Figure 2:
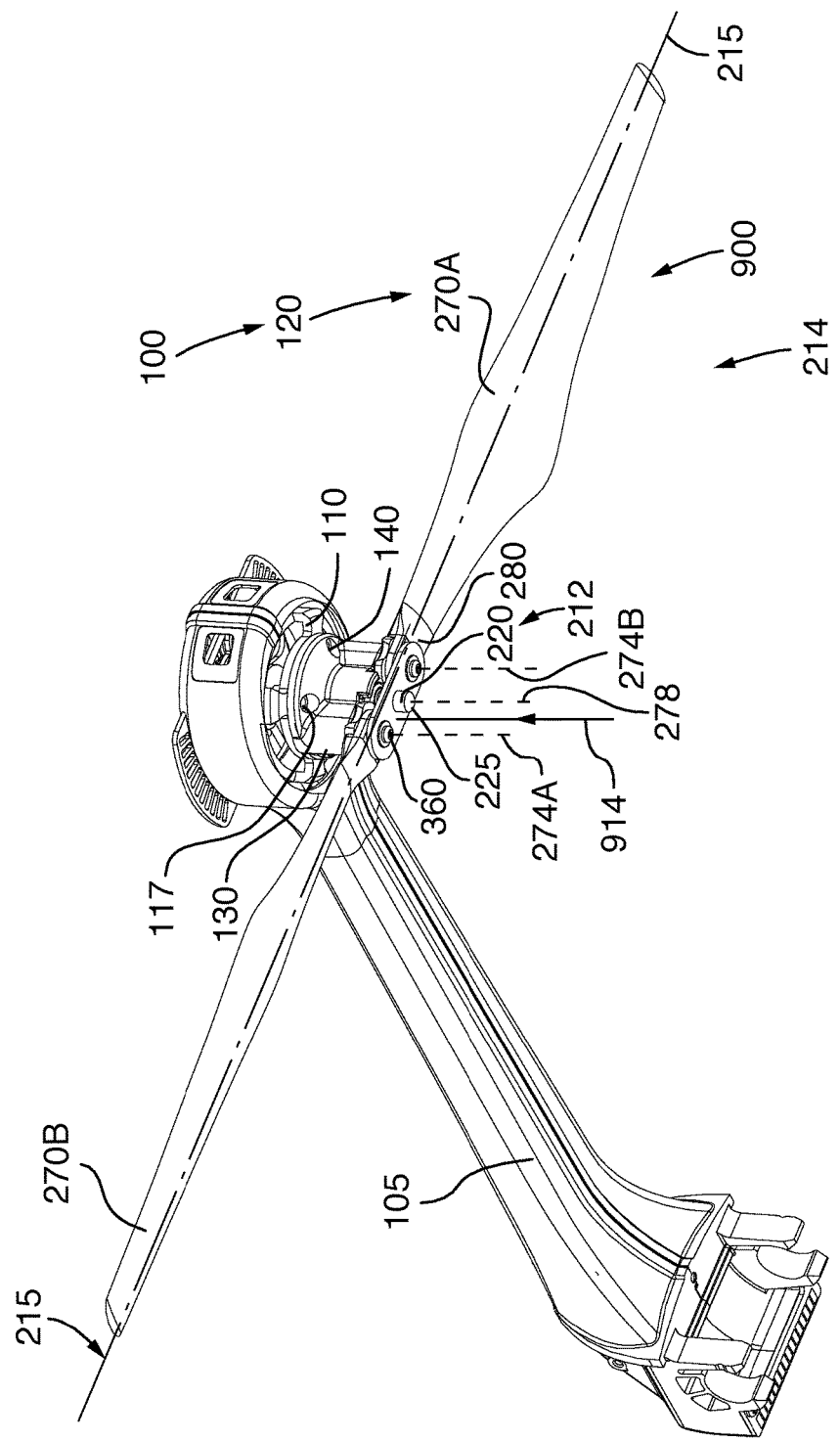
FIG. 2 (SHEET 2/9) is an isometric view of an embodiment of the propeller assembly 120 of FIG. 1, as mounted onto an embodiment of a propeller arm 105.
Figure 8:
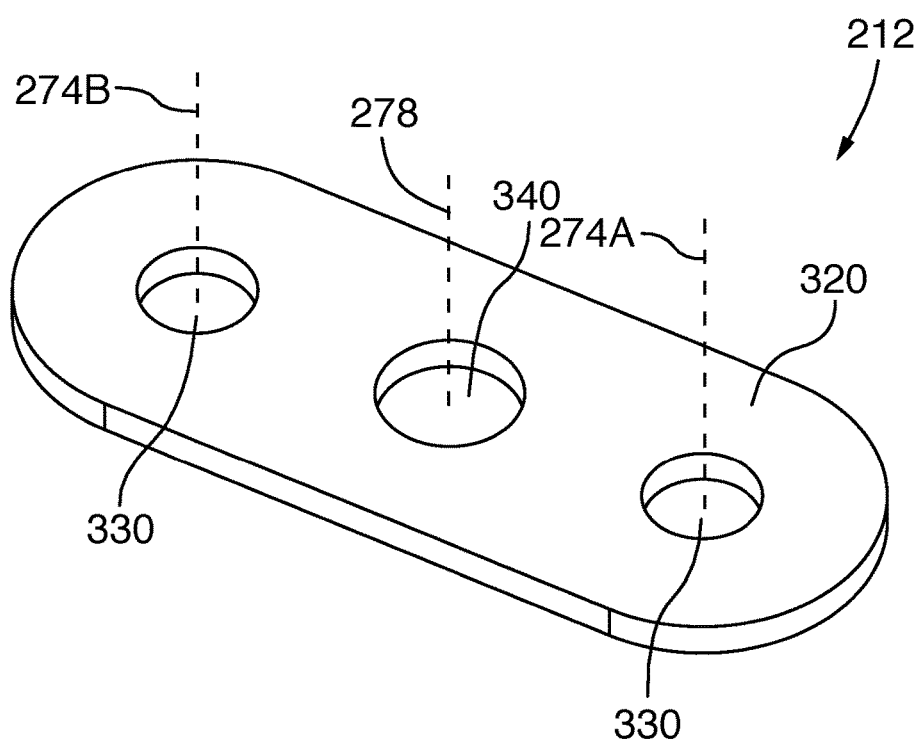
Figure 9A:
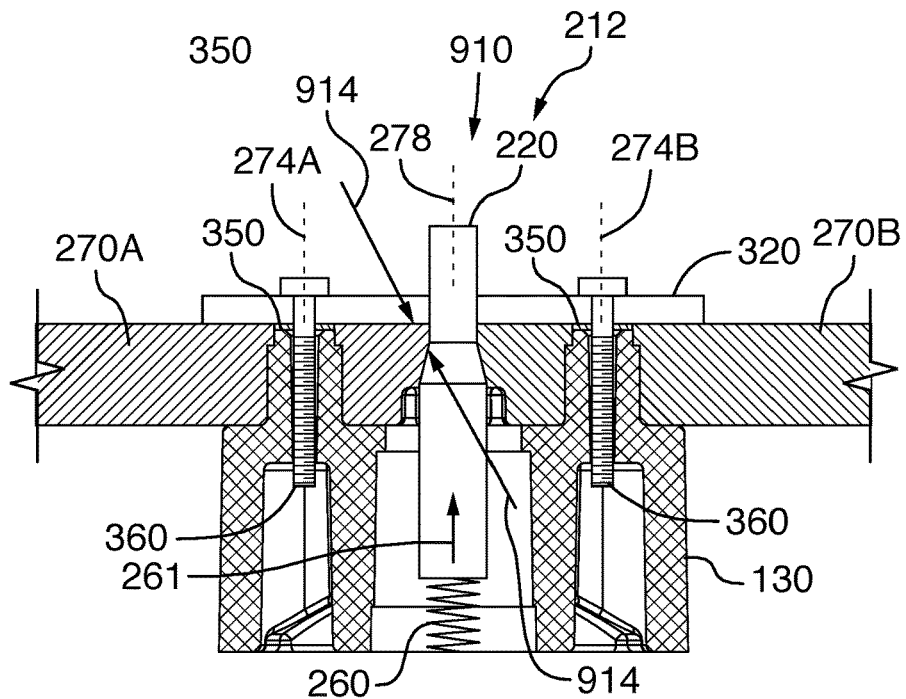
Figure 9B:
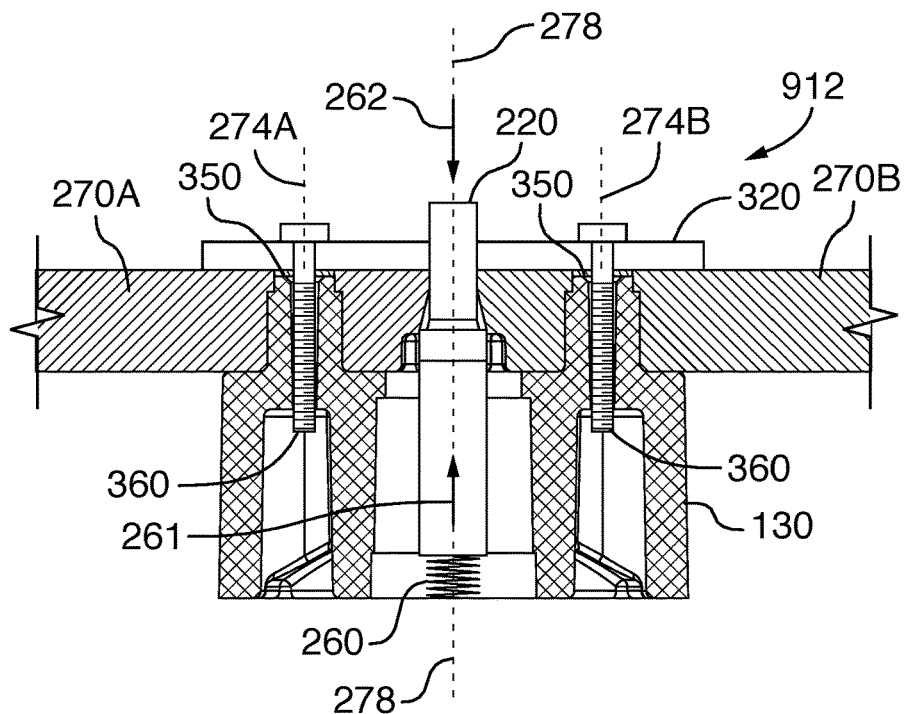

FIG. 8 (SHEET 8/9) is an isometric view of a retaining plate 320 for use with the propeller assembly 120 of FIG. 1; and FIG. 9A and FIG. 9B (SHEET 9/9) depict cross-sectional view of the rotatable-propeller assembly 120 of FIG. 2.

In the drawings, embodiments of the invention are illustrated by way of example. It is to be expressly understood that the description and drawings are only for the purpose of illustration and as an aid to understanding, and are not intended as a definition of the limits of the invention. The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating an understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 100 vehicle
102 hovering unmanned aerial vehicle, or HUAV
103 folding propeller system
104 vehicle body
105 propeller arm
110 propeller motor
115 rotor assembly
117 motor mounting screws
120 propeller assembly, or rotatable-propeller assembly
130 propeller base
135 propeller base mounting platform
140 motor mounting holes
150 offset propeller mounting plane
155 base pin hole
160 rotation-stop assembly
170 propeller mounting pin, or propeller mounting pins
180 plate retaining bosses
190 mounting screw holes
200 base spring pocket
210 pocket retaining lip
212 blade-lock assembly
214 locked in-line fixed-blade orientation
215 longitudinal blade-extension line
216 locked off-line fixed-blade orientation
220 locking pin
225 pin head
230 locking taper
240 pin retaining lip
250 pin spring pocket
260 locking spring
270A propeller, or propeller blade, or rotatable propeller blade
270B propeller, or propeller blade, or rotatable propeller blade
271 end-mountable portions
274A spaced-apart blade-mounting axis
274B spaced-apart blade-mounting axis
278 central-rotation axis
280 propeller hub, or propeller hubs
290 locking cutout, or locking cutouts
300 lead-in feature, or lead-in features
305 propeller mounting hole
320 retaining plate
330 boss hole, or boss holes
340 locking pin guide hole
350 thrust washer, or thrust washers
360 propeller retaining screw, or propeller retaining screws
900 blade-deployment position
902 blade-storage position
910 lock position
912 unlock position
914 clamping force

DETAILED DESCRIPTION OF THE NON-LIMITING EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a". The aspects (examples, alterations, modifications, options, variations, embodiments and any equivalent thereof) are described with reference to the drawings. It should be understood that the invention is limited to the subject matter provided by the claims, and that the invention is not limited to the particular aspects depicted and described.

Hereafter, it will be appreciated that the description identifies and describes options and variations of the hovering unmanned aerial vehicle 102, regardless of whether the description identifies the options and/or variations of the hovering unmanned aerial vehicle 102 by way of explicit terms and/or non-explicit terms. The hovering unmanned aerial vehicle 102 is hereafter referred to as the HUAV 102.

FIG. 1 (SHEET 1/9) depicts an isometric view of a vehicle 100 including a rotatable-propeller assembly 120.

One particular embodiment is shown in the FIGS. Other embodiments may be envisioned.

In accordance with FIG. 1, the vehicle 100 includes (and is not limited to) a vehicle body 104. The vehicle body 104 extends from a hovering unmanned aerial vehicle 102, hereafter referred to as the HUAV 102. In general terms, the rotatable-propeller assembly 120 is fixedly positioned relative to the vehicle body 104, and the blade-lock assembly 212 (depicted in FIG. 2) is fixedly positioned relative to the vehicle body 104. The vehicle 100 further includes a propeller arm 105. The vehicle body 104 supports the propeller arm 105. The propeller arm 105 is configured to operatively support the rotatable-propeller assembly 120, such as at the distal ends of the propeller arm 105. Four instances of the propeller arm 105 extend radially from the vehicle body 104. It will be appreciated that any orientation and alignment of the propeller arm 105 is permitted provided that the rotatable-propeller assembly 120 may be operated without interference from the propeller arm 105.

In accordance with an example, an vehicle 100 includes a combination of the HUAV 102 and a propeller assembly 120.

Other Uses

In accordance with an option, the propeller assembly 120 is deployed or used with any system or the vehicle 100 where the propeller assembly 120 must be reoriented. In place of using the propeller assembly 120 on an HUAV 102, the propeller assembly 120 may be used with non-hovering aerial vehicles, hovering manned aerial vehicles, devices such as missiles which may not be conventionally classified as vehicles, an underwater propeller-driven vehicle or a rotor-driven vehicle or devices, or any other uses.

FIG. 2 (SHEET 2/9) depicts an isometric view of the rotatable-propeller assembly 120 of FIG. 1, in which the rotatable-propeller assembly 120 is placed in a blade-deployment position 900.

Figure 4:
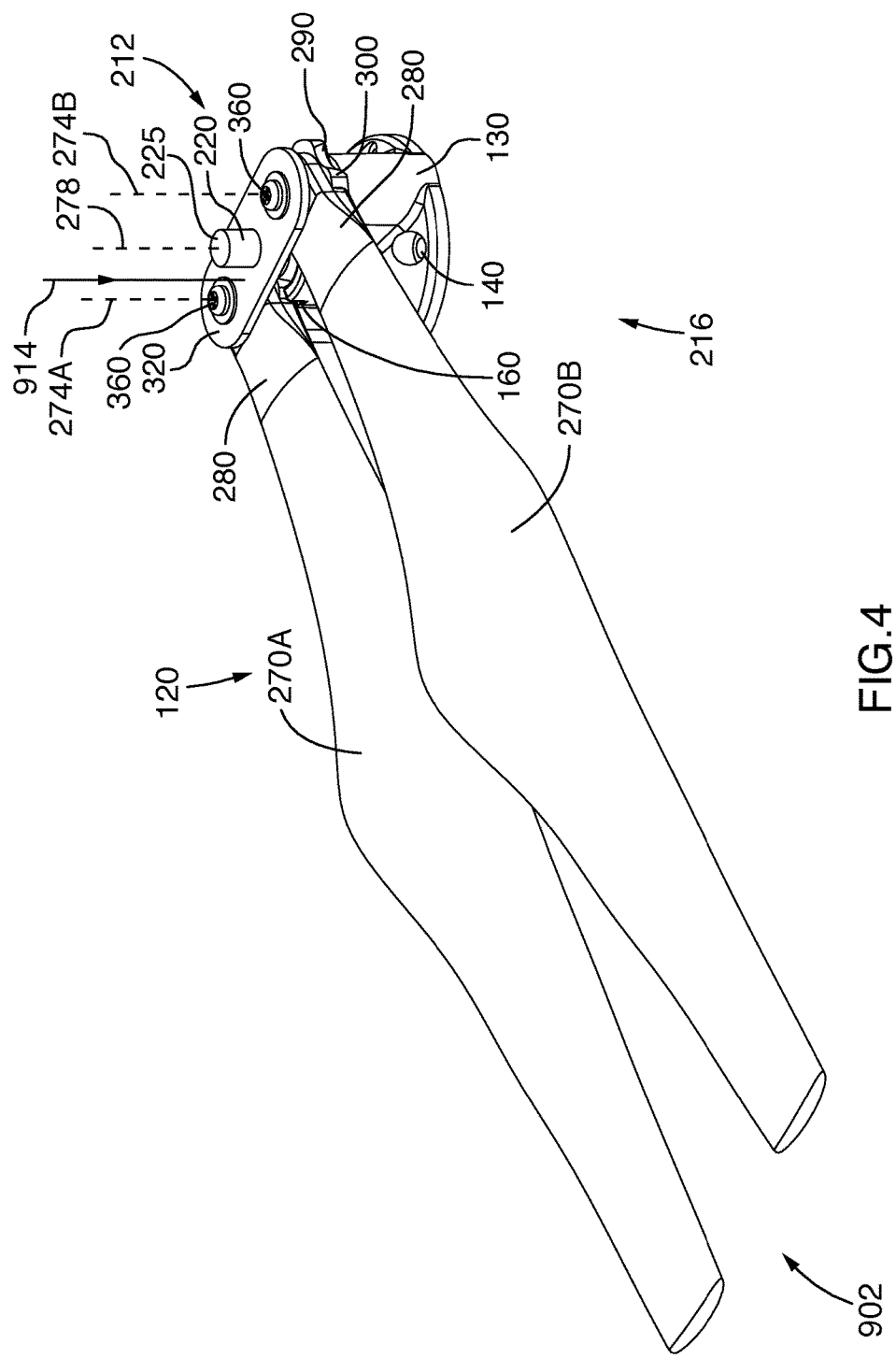
FIG. 4 (SHEET 4/9) is an isometric view of an embodiment of the propeller assembly 120 of FIG. 1 placed in the folded state.

FIG. 4 (SHEET 4/9) depicts an isometric view of the rotatable-propeller assembly 120 of FIG. 1.

Figure 6A:
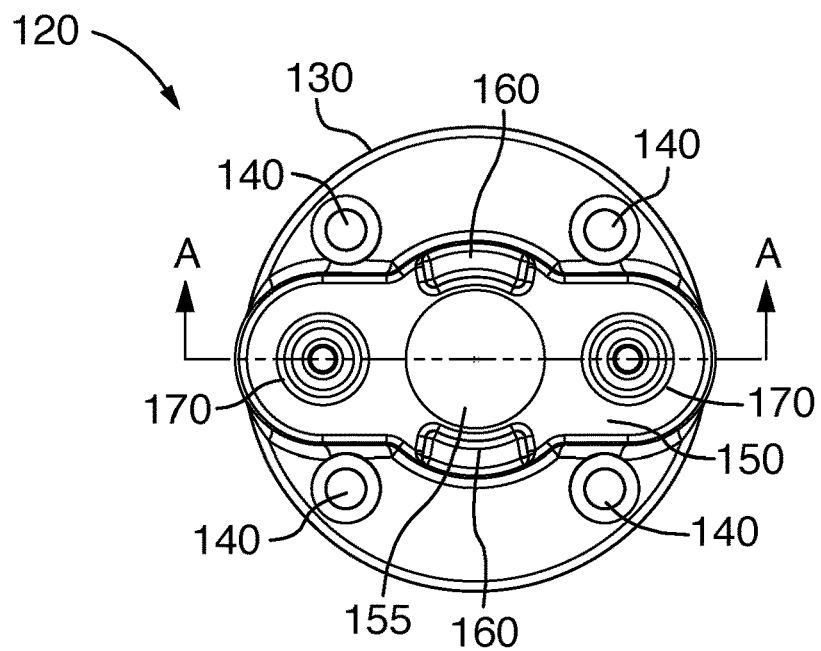
FIG. 6A (SHEET 6/9) is an overhead view of an embodiment of a propeller base 130 for use with the propeller assembly 120 of FIG. 1.
Figure 6B:
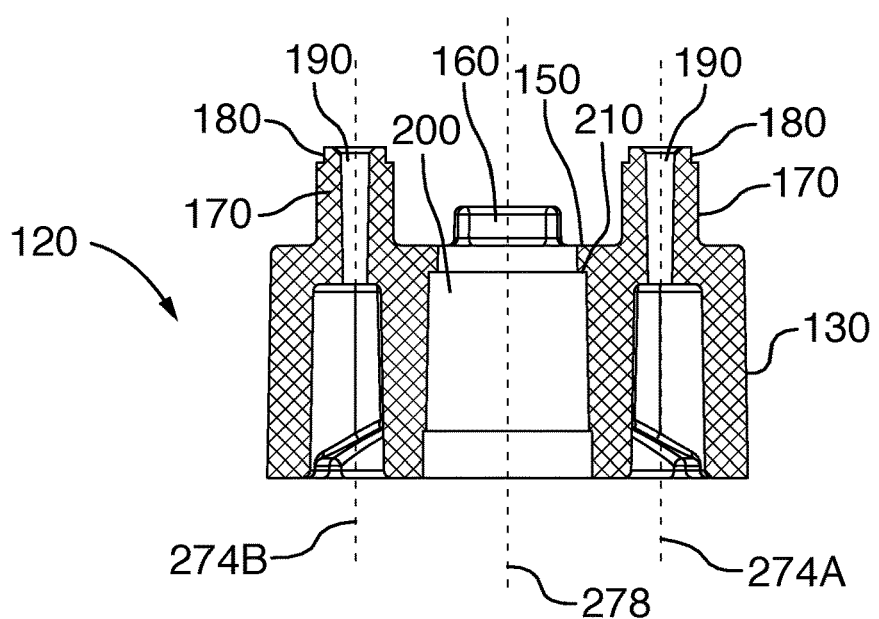
FIG. 6B (SHEET 6/9) is a cross-section view of an embodiment of the propeller base 130 of FIG. 6A, sectioned as per the line A-A in FIG. 6A.
Figure 6C:
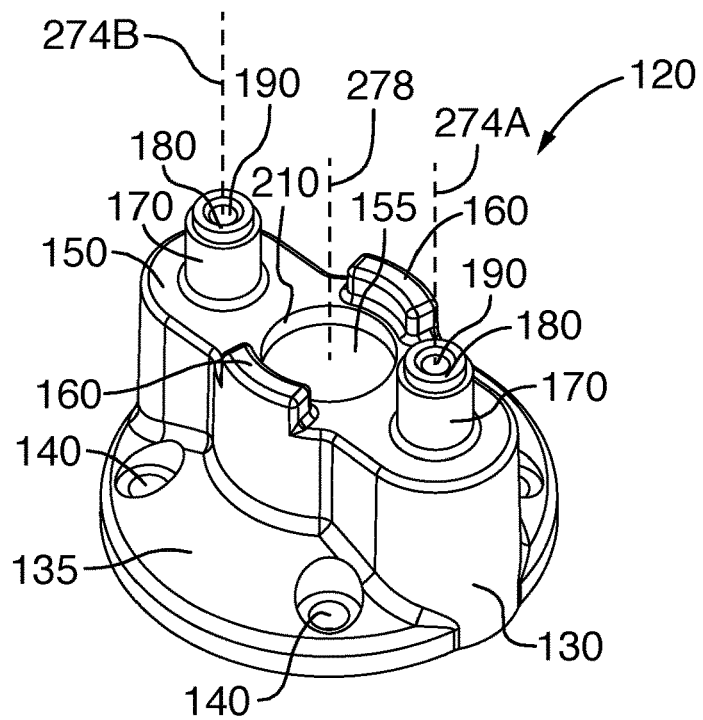
FIG. 6C (SHEET 6/9) is an isometric view of the first side of an embodiment of the propeller base 130 of FIG. 6A.

As depicted, the embodiment of the propeller assembly 120 is mounted directly to the rotor assembly 115 (as depicted in FIG. 2) of the propeller motor 110, using the motor mounting screws 117, which tightly fasten the propeller base 130 to the rotor assembly 115 through the motor mounting holes 140 on the propeller base mounting platform 135 (as depicted in FIG. 6C).

Other embodiments may envision various motor geometries (such as where the motor's exterior casing rotates and the central portion remains stationary, or where the motor's accessible rotor is a pin rather than a plane, or where the motor is actually an engine and the rotor is its drive axle, or where the motor or engine is mounted elsewhere in the HUAV 102 and the rotor is an axle connected to the motor or engine via a transmission or gearing system, etc.), various methods of coupling of the rotor assembly 115 of the propeller motor 110 to the propeller assembly 120 (such as a clamp, magnetic coupling, pin-based fasteners or any other method of attaching the rotating portion of the rotor assembly 115 of the propeller motor 110 to the propeller assembly 120, etc.) or other orientations of the propeller assembly 120 with respect to the HUAV 102 (such as the instances of the propeller assembly 120 mounted on the top of the propeller arm 105, the instances of the propeller assembly 120 mounted on the side of the propeller arm 105 and connected to the rotor assembly 115 of the propeller motor 110 with an angled transmission, the instances of the propeller assembly 120 mounted moveably on the propeller arm 105 such that their angle can change to adjust lift and other flight characteristics of the HUAV 102, etc.).

With reference to FIG. 2 and FIG. 4, the propeller arm 105 operatively supports a propeller motor 110, at the distal end of the propeller arm 105 if so desired.

In general terms, the vehicle 100 includes (and is not limited to) a rotatable-propeller assembly 120 including rotatable propeller blades 270A, 270B. The vehicle 100 also includes a blade-lock assembly 212. The blade-lock assembly 212 is cooperative with the rotatable propeller blades 270A, 270B. The blade-lock assembly 212 is configured to selectively lockably fixedly connect the rotatable propeller blades 270A, 270B together by application of a clamping force 914 (depicted in FIG. 9A) to the rotatable propeller blades 270A, 270B. The blade-lock assembly 212 is also configured to selectively lockably disconnect the rotatable propeller blades 270A, 270B from each other by removal of the clamping force 914 from the rotatable propeller blades 270A, 270B.

In view of the foregoing, there is provided a method of the vehicle 100. The method includes selectively lockably fixedly connecting instances of rotatable propeller blades 270A, 270B of a rotatable-propeller assembly 120 together by application of a clamping force 914 to the rotatable propeller blades 270A, 270B. The method also include selectively lockably disconnecting the rotatable propeller blades 270A, 270B from each other by removal of the clamping force 914 from the rotatable propeller blades 270A, 270B.

In accordance with a specific option, the blade-lock assembly 212 is further configured to selectively lockably fixedly connect the rotatable propeller blades 270A, 270B together in such a way that the rotatable propeller blades 270A, 270B are lockably fixedly positionable in any one of a blade-deployment position 900 (as depicted in FIG. 2) and a blade-storage position 902 (as depicted in FIG. 4).

In accordance with another specific option, the blade-lock assembly 212 is further configured to selectively lockably disconnect the rotatable propeller blades 270A, 270B from each other in such a way that the rotatable propeller blades 270A, 270B are rotatable independently of each other between the blade-deployment position 900 (depicted in FIG. 2) and the blade-storage position 902 (depicted in FIG. 4).

In accordance with another specific option, each of the rotatable propeller blades 270A, 270B is configured to rotate about a central-rotation axis 278 whether the rotatable propeller blades 270A, 270B are in a condition of being: (A) locked relative to each other, and (B) not locked relative to each other. A fixedly locked condition or locked position is depicted in FIG. 2, and a fixedly unlocked position or unlocked condition is depicted in FIG. 2 and FIG. 4). In accordance with an option, each of the rotatable propeller blades 270A, 270B is configured to rotate about a respective instance of a spaced-apart blade-mounting axis 274A, 274B if and only if the rotatable propeller blades 270A, 270B are fixedly unlocked relative to each other. In accordance with another option, each of the rotatable propeller blades 270A, 270B is configured to: (A) rotate about a central-rotation axis 278 whether the rotatable propeller blades 270A, 270B are in a condition of being: (i) locked relative to each other, and (ii) not locked relative to each other, and (B) rotate about a respective instance of a spaced-apart blade-mounting axis 274A, 274B if and only if the rotatable propeller blades 270A, 270B are fixedly unlocked relative to each other.

In accordance with a specific option, the central-rotation axis 278 and each respective instance of the spaced-apart blade-mounting axis 274A, 274B extend in a co-parallel orientation. In accordance with another specific option, the central-rotation axis 278 is geometrically positioned between respective instances of the spaced-apart blade-mounting axis 274A, 274B.

In accordance with another specific option, the blade-lock assembly 212 is configured to fixedly lock orientation of the rotatable propeller blades 270A, 270B in any one of a locked in-line fixed-blade orientation 214 (as depicted in FIG. 2) and a locked off-line fixed-blade orientation 216 (as depicted in FIG. 4).

In accordance with another specific option, the blade-lock assembly 212 is oriented along the central-rotation axis 278 of the rotatable propeller blades 270A, 270B.

As depicted with reference to FIG. 2, the vehicle 100, in this embodiment, further includes a propeller motor 110; it will be appreciated that in other embodiments, the propeller motor 110 may be centrally located in vehicle body 104 (or positioned in other suitable locations). The propeller motor 110 is supportably received by the propeller arm 105. A rotor assembly 115 is mounted supportably in the propeller motor 110 or is operatively supported by the propeller motor 110. A propeller base 130 is connected (coupled) fixedly to the rotor assembly 115. The propeller base 130 extends axially from the rotor assembly 115. The propeller base 130 is configured to support rotation of the rotatable propeller blades 270A, 270B. The propeller base 130 is also configured to support the blade-lock assembly 212 relative to the rotatable propeller blades 270A, 270B. The rotor assembly 115 is fixedly coupled to the propeller base 130 in such a way that in response to actuation of the propeller motor 110, the rotor assembly 115 and the propeller base 130 and the rotatable-propeller assembly 120 are rotatable. The rotatable-propeller assembly 120 is configured to propel the vehicle 100 (once actuated, of course).

In accordance with a specific option, the blade-lock assembly 212 is further configured to fixedly lock and maintain fixed-blade orientation of the rotatable propeller blades 270A, 270B relative to each other in such a way that the rotatable propeller blades 270A, 270B are rotatable about a central-rotation axis 278 once the rotatable propeller blades 270A, 270B are fixedly locked together by the blade-lock assembly 212.

In accordance with another specific option, the blade-lock assembly 212 is configured to fixedly lock orientation of the rotatable-propeller assembly 120 in a first lock mode. In the first lock mode, the blade-lock assembly 212 fixedly locks orientation of the rotatable-propeller assembly 120 in such a way that the rotatable propeller blades 270A, 270B are lockably fixedly positioned to extend locked in-line relative to each other in a locked in-line fixed-blade orientation 214. In accordance with FIG. 2, in the locked in-line fixed-blade orientation 214, the rotatable propeller blades 270A, 270B are lockably fixedly positioned longitudinally lengthwise with proximal edges (or end sections) facing each other, and extend along a longitudinal blade-extension line 215.

In accordance with another specific option, the rotatable propeller blades 270A, 270B each includes end-mountable portions 271. Each of the end-mountable portions 271 is pivotally mountable at the respective instance of the spaced-apart blade-mounting axes 274A, 274B that extend parallel to each other, and are spaced apart from each other. In a locked in-line fixed-blade orientation 214, the rotatable propeller blades 270A, 270B are: (A) not pivotally rotatable about each of the respective instances of the spaced-apart blade-mounting axis 274A, 274B, and (B) pivotally rotatable about the central-rotation axis 278 that is geometrically positioned between the respective instances of the spaced-apart blade-mounting axis 274A, 274B. The central-rotation axis 278 and the respective instances of the spaced-apart blade-mounting axis 274A, 274B extend in the co-parallel orientation.

In accordance with another specific option, the blade-lock assembly 212 is further configured to permit unlocked relative movement of the rotatable propeller blades 270A, 270B between a locked in-line fixed-blade orientation 214 (as depicted in FIG. 2) and a locked off-line fixed-blade orientation 216 (as depicted in FIG. 4). During relative movement, the rotatable propeller blades 270A, 270B are: (A) pivotally rotatable about each of the respective instance of the spaced-apart blade-mounting axis 274A, 274B, and (B) not pivotally rotatable about the central-rotation axis 278 that is geometrically positioned between the respective instances of the spaced-apart blade-mounting axis 274A, 274B, and the central-rotation axis 278 and the respective instances of the spaced-apart blade-mounting axis 274A, 274B extend in a co-parallel orientation.

In accordance with another specific option, in a blade-deployment position 900, the rotatable propeller blades 270A, 270B are lockably fixedly positioned to extend locked in-line relative to each other, longitudinally lengthwise with proximal edges (or end sections) facing each other, and to extend along a longitudinal blade-extension line 215.

In accordance with another specific option, the rotatable-propeller assembly 120 extends outwardly radially from the propeller base 130. For the case where the blade-lock assembly 212 locks the rotatable propeller blades 270A, 270B together: (A) the rotatable-propeller assembly 120 is configured to rotate along a rotation plane having a central-rotation axis 278 extending orthogonally through the rotation plane, and also extending orthogonally through the propeller base 130, and (B) the rotatable propeller blades 270A, 270B extend radially from the central-rotation axis 278. For the case where the blade-lock assembly 212 does not lock the rotatable propeller blades 270A, 270B together (so that movement of the rotatable propeller blades 270A, 270B is possible between the positions depicted in FIG. 2 and FIG. 4), each of the rotatable propeller blades 270A, 270B is pivotally movable to the propeller base 130 at a respective instance of a spaced-apart blade-mounting axis 274A, 274B extending radially through the propeller base 130.

Referring to FIG. 2, in some embodiments, the folding propeller system 103 may comprise some or all of the following elements: the HUAV 102, a propeller arm 105, and a propeller motor 110, mounted on the propeller arm 105 near a first end of the propeller arm 105.

In accordance with an example, the propeller motor 110 includes a combination of a rotor assembly 115, motor mounting screws 117, and a propeller assembly 120. The rotor assembly 115 is mounted rotatably within or without the propeller motor 110. The motor mounting screws 117 are fastened through a propeller assembly 120 and into the rotor assembly 115. The propeller assembly 120 is mounted onto the rotor assembly 115.

In various embodiments, the propeller assembly 120 may comprise some or all of the following: a propeller base 130 secured to the rotor assembly 115 of the propeller motor 110.

Figure 3:
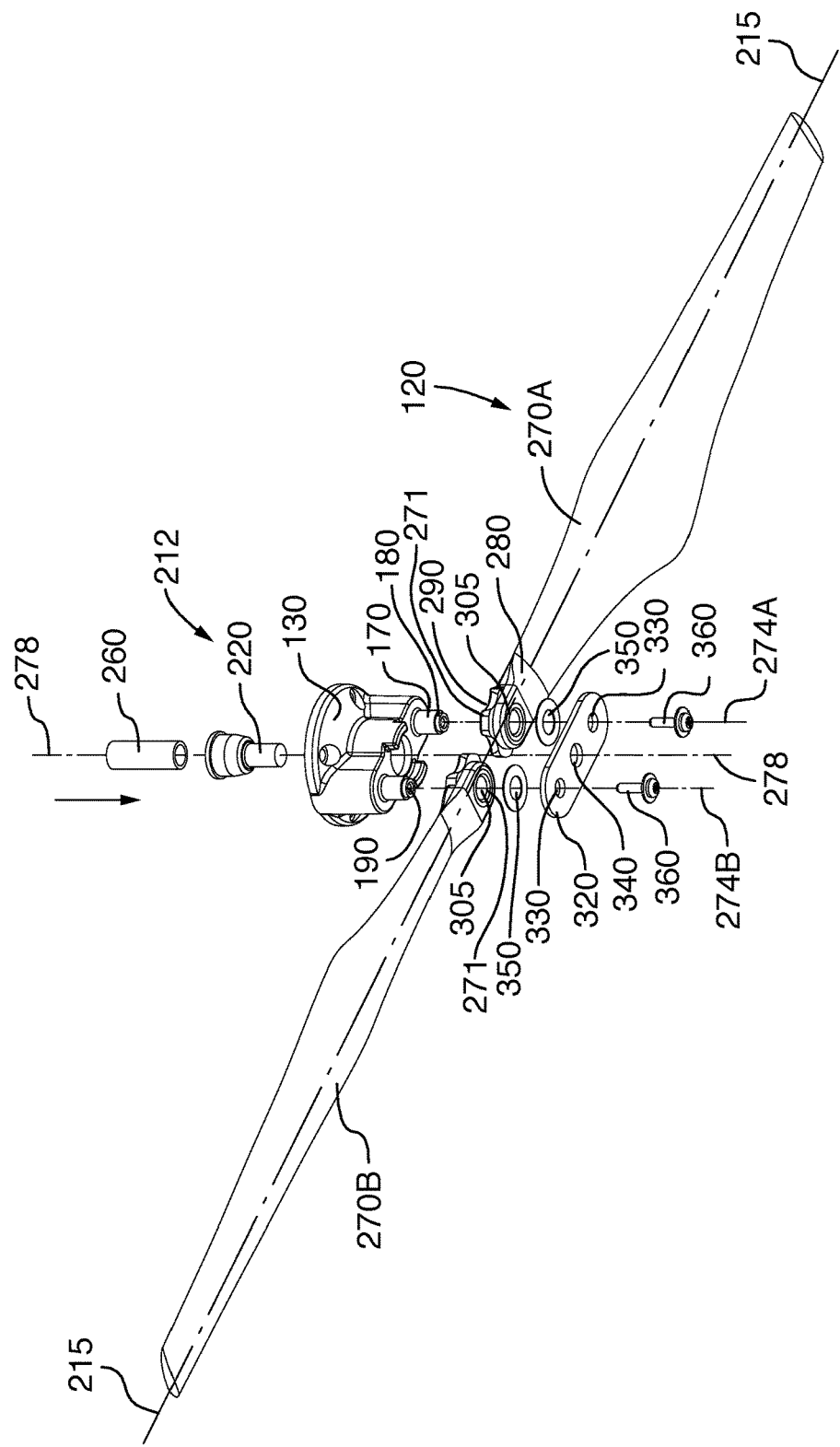
FIG. 3 (SHEET 3/9) is an exploded isometric view of an embodiment of the propeller assembly 120, viewed in the same orientation as in FIG. 2.

FIG. 3 (SHEET 3/9) depicts an exploded view of the rotatable-propeller assembly 120 of FIG. 2.

In accordance with the embodiment shown in FIG. 3, the vehicle 100 further includes a locking spring 260. The locking spring 260 is contained (at least in part) in the propeller base 130. The locking spring 260 is interactive with the locking pin 220. The locking spring 260 is configured to provide the clamping force 914 (depicted in FIG. 9A) to the locking pin 220. As depicted in FIG. 3, the blade-lock assembly 212 is oriented along the central-rotation axis 278 of the rotatable propeller blades 270A, 270B. Other embodiments may employ a different mechanism for creating the clamping force 914, such as an elastic band or membrane, for example.

FIG. 3 clearly shows the components of an embodiment of the propeller assembly 120. Each instance of the propeller blade 270A, 270B is held to the propeller base 130 on a propeller mounting pin 170 by a single instance of the propeller retaining screw 360. The propeller retaining screw 360 passes through a boss hole 330 on the retaining plate 320. The retaining plate 320 is configured to absorb the forces caused by the rotation of the entire instance of the propeller assembly 120 during normal flight. The benefit of using the retaining plate 320 is that the propeller base 130 may be constructed of lighter, softer or less-expensive material than would otherwise be needed to absorb all of the forces acting on the propeller mounting pins 170. Other embodiments may use a differently-shaped instance of the retaining plate 320, may place the retaining plate 320 elsewhere in the propeller assembly 120 (for example, immediately adjacent to the propeller base 130), may incorporate the retaining plate 320 into the propeller base 130, or may do away with the retaining plate 320 entirely.

In the shown embodiment, the propeller mounting pin 170 also passes through a thrust washer 350. The thrust washer 350 is configured to redistribute the retaining force of the tightened instance of the propeller retaining screw 360 across a larger area and forces the propeller hub 280 against the propeller base 130. This added force allows for stronger retaining contact between the locking pin 220 and the locking cutouts 290, and thereby provides greater (improved) stability of the propeller blades 270A, 270B during operation (in flight). As well, the force from the thrust washer 350 allows for the locking spring 260 to exert less of a force for a similar retaining ability, which in turns makes it easier for the user to depress the locking pin 220. In this embodiment, the thrust washer 350 is a Belleville spring washer. Other embodiments may use a different type of the thrust washer 350, may do away with the thrust washer 350 entirely, or may use a different element to force the propeller blade 270A, 270B or to the propeller assembly 120 against the propeller base 130. A Belleville washer, also known as a coned-disc spring, a conical spring washer, a disc spring, a Belleville spring or a cupped spring washer, is a type of spring shaped like a washer, and it has a frusto-conical shape which gives the washer a spring characteristic.

The depicted embodiment, the locking pin 220, shown in context in FIG. 3 and in more detail in FIG. 7, is normally situated partly within the base spring pocket 200 of the propeller base 130 (as depicted in FIG. 6 D), such that its instance of a pin head 225 is extended out of the base pin hole 155 of the propeller base 130 (as depicted in FIG. 6C) and through the locking pin guide hole 340 of the retaining plate 320. In its normal situation, the locking taper 230 of the locking pin 220 engages each locking cutout 290 of the propeller blade 270A, 270B or the propeller assembly 120. The locking pin 220 is pressed out of the propeller base 130 by the locking spring 260, which the locking spring 260 is mounted inside the pin spring pocket 250, which is within the base spring pocket 200 of the propeller base 130. The locking spring 260 presses the locking pin 220 out of the base spring pocket 200 of propeller base 130, and presses against the rotor assembly 115 (as depicted in FIG. 2) on the other side. The locking pin 220 is prevented from leaving the base spring pocket 200 of propeller base 130 by the locking taper 230 pressing against the locking cutout 290; in the event of significant wear on the locking pin 220 or the locking cutout 290, or in the event of part failure, the locking pin 220 will stay held in the base spring pocket 200 of propeller base 130 by the pin retaining lip 240 catching against the pocket retaining lip 210. Other embodiments of the locking pin 220 may eliminate the locking taper 230; however, the locking taper 230 is pressed against the lead-in features 300 on the propeller blade 270A, 270B by the locking spring 260 in such a way as to cause the propeller blade 270A, 270B to rotate into either a folded state (a propeller-folded state) or an extended state (a propeller-extended state), and reference is made to the operation described below. This makes it less important for the user to properly align the instances of the propeller blade 270A, 270B during packing or deployment, and adds considerable smoothness to the packing and deployment operations of the propeller blade 270A, 270B.

In one embodiment, the retaining plate 320 is held to the rest of the propeller blade 270A, 270B or the propeller assembly 120 by the propeller retaining screws 360. The propeller retaining screws 360 are mounted through the thrust washers 350 and the propeller blades 270A, 270B into the mounting screw holes 190, which are inside the propeller mounting pins 170. The retaining plate 320 is aligned such that the plate retaining bosses 180 come through the boss holes 330 on the retaining plate 320.

In one embodiment, each propeller blade 270A, 270B is made of two separate parts: the propeller hub 280 (with its features, namely the locking cutouts 290, the lead-in features 300 and the propeller mounting hole 305) is formed separately and then partly embedded within the propeller blade 270A, 270B, which is formed around it. In other embodiments, the propeller hub 280 and the propeller blade 270A, 270B may be the same part, with the features present on the propeller hub 280 (the locking cutouts 290, the lead-in features 300 and the propeller mounting hole 305) formed as part of a single unit of the propeller blade 270A, 270B; such a single unit of the propeller blade 270A, 270B may be more difficult or expensive for some manufacturers to make, though other manufacturers may find a cost or time savings in making a single unit of the propeller blade 270A, 270B instead of assembling two parts. It is easy to envision other embodiments, where the propeller hub 280 or the propeller blade 270A, 270B may be formed out of multiple parts, or where the propeller hub 280 and the propeller blade 270A, 270B may be formed from different materials.

In accordance with another embodiment, each propeller blade 270A, 270B has a propeller hub 280, with each propeller hub 280 including a single instance of the locking cutout 290. The lead-in features 300, optionally, are positioned on either side of the locking cutout 290. For the case where the propeller blades 270A, 270B with only a single instance of the locking cutout 290 are used (deployed), and where the locking cutouts 290 are situated (positioned or oriented) such that the locking cutouts 290 contact the locking pin 220 when the propeller blades 270A, 270B are in the blade deployment position 900, the blade-lock assembly 212 (also called a locking mechanism) is configured to: (A) lock the propeller blades 270A, 270B into the locked state when the propeller blades 270A, 270B are placed in the blade deployment position 900, and (B) not lock the propeller blades 270A, 270B in the blade storage position 902. Specifically, the blade-lock assembly 212 is further configured to selectively lockably fixedly connect the rotatable propeller blades 270A, 270B together in such a way that the rotatable propeller blades 270A, 270B are lockably fixedly positionable in the blade-deployment position 900. For the case where the propeller blades 270A, 270B are not locked in the storage position, and which, when the propeller motor 110 starts up, the propeller motor 110 flings (urges) the propeller blades 270A, 270B into the deployed position in such a way that the propeller blades 270A, 270B become locked in the deployed position (without operator assistance). This option allows for faster deployment of the vehicle 100 or the UAV 102 in the field. More generally, for the case where the propeller blades 270A, 270B are not locked in the storage position, and the propeller blades 270A, 270B are urged into the deployed position, the propeller blades 270A, 270B become locked by the blade-lock assembly 212 in the deployed position without operator assistance, thereby allowing for relatively faster deployment in the field. Generally, the blade-lock assembly 212 is configured to lock the propeller blades 270A, 270B in a deployed position without operator assistance for the case where the propeller blades 270A, 270B are not locked in the storage position, and the propeller blades 270A, 270B are urged into the deployed position.

FIG. 4 (SHEET 4/9) depicts an isometric view of the rotatable-propeller assembly 120 of FIG. 1.

FIG. 4 depicts the blade-storage position 902. Once the rotatable propeller blades 270A, 270B are unlocked relative to each other, then the rotatable propeller blades 270A, 270B free to rotate between the blade-deployment position 900 (depicted in FIG. 2) and the blade-storage position 902 (depicted in FIG. 4).

In accordance with another specific option, the blade-lock assembly 212 is further configured to fixedly unlock and not maintain fixed-blade orientation of the rotatable propeller blades 270A, 270B relative to each other in such a way that each of the rotatable propeller blades 270A, 270B is independently rotatable about a respective instance of a spaced-apart blade-mounting axis 274A, 274B once the rotatable propeller blades 270A, 270B are fixedly unlocked from each other by the blade-lock assembly 212.

In accordance with another specific option, in a blade-storage position 902, the rotatable propeller blades 270A, 270B are lockably fixedly positioned to extend parallel relative to each other in an off-line arrangement, and are spaced apart from each other, and the rotatable propeller blades 270A, 270B are also fixedly positioned adjacent to each other in a side-by-side relationship. In accordance with an option, in the side-by-side relationship, the rotatable propeller blades 270A, 270B are lockably fixedly positioned on opposite sides of a propeller arm 105, and adjacent to each other in the side-by-side arrangement.

In accordance with another specific option, the blade-lock assembly 212 is configured to fixedly lock orientation of the rotatable-propeller assembly 120 in a second lock mode. In the second lock mode, the blade-lock assembly 212 fixedly locks orientation of the rotatable-propeller assembly 120 in such a way that the rotatable propeller blades 270A, 270B are lockably fixedly positioned to extend fixedly locked off-line relative to each other in a locked off-line fixed-blade orientation 216.

In accordance with another specific option, in the locked off-line fixed-blade orientation 216, the rotatable propeller blades 270A, 270B are lockably fixedly positioned parallel relative to each other, and are spaced apart from each other.

In accordance with another specific option, in a blade-storage position 902, the rotatable propeller blades 270A, 270B are lockably fixedly positioned to extend parallel relative to each other, and are spaced apart from each other in an off-line arrangement.

In accordance with another specific option, in a blade-storage position 902, the rotatable propeller blades 270A, 270B are lockably fixedly positioned to extend parallel relative to each other in an off-line arrangement, and are spaced apart from each other, and the rotatable propeller blades 270A, 270B are also positioned adjacent to each other in a side-by-side relationship.

In accordance with another specific option, in a blade-storage position 902, the rotatable propeller blades 270A, 270B are lockably fixedly positioned to extend parallel relative to each other in an off-line arrangement, and are spaced apart from each other, and the rotatable propeller blades 270A, 270B are also fixedly positioned adjacent to each other in a side-by-side relationship; and in the side-by-side relationship, the rotatable propeller blades 270A, 270B are lockably fixedly positioned on opposite sides of a propeller arm 105.

Operation

Referring to FIG. 2 and FIG. 4, the folding instance of the propeller assembly 120 works in this embodiment by allowing the propeller assembly 120 to be easily switched between two configurations: the folded state (as depicted in FIG. 4) and the extended state (as depicted in FIG. 2). As well, these two states are clearly shown in FIG. 1. Additionally, the mechanism may be locked, wherein the propeller blades 270A, 270B are in the folded state or the extended state, or the unlocked state where the propeller blades 270A, 270B are positioned in between the folded state (FIG. 4) and the extended state (FIG. 2).

In the folded state (FIG. 4), the propeller blades 270A, 270B are pulled parallel to the propeller arm 105 (as depicted in FIG. 2) to which they are mounted; the propeller arm 105 protects the propeller blades 270A, 270B in the folded state from any force from above. As well, the propeller blades 270A, 270B are far less susceptible to damage from the sides than when they are extended for flight.

In the extended state (FIG. 2), the propeller blades 270A, 270B are pulled approximately collinear with one another, and possibly perpendicular to the propeller arm 105 to which they are mounted (though this angle changes as the propeller blades 270A, 270B rotate during normal operation).

In each of the folded state (FIG. 4) and the extended state (FIG. 2), the propeller assembly 120 holds the propeller blades 270A, 270B firmly in position. More specifically, the locking taper 230 of the locking pin 220, under the spring force of the locking spring 260, presses against a locking cutout 290 (as depicted in FIGS. 3, 9A, and 9B). This force prevents the propeller blade 270A, 270B from rotating about the propeller mounting pins 170 when the propeller assembly 120 is either in the folded state or the extended state.

To switch between the folded state (FIG. 4) and the extended state (FIG. 2), the user presses the locking pin 220 until the locking taper 230 disengages from the locking cutout 290. This allows the propeller blade 270A, 270B to rotate about the propeller mounting pin 170. The user holds the locking pin 220 depressed while rotating each propeller blade 270A, 270B about its respective propeller mounting pin 170. Once the propeller blade 270A, 270B has rotated sufficiently, the locking cutout 290 can no longer allow the locking pin 220 to return to its normal resting state, and the user may rotate both propeller blades 270A, 270B into the other state with ease without having to also depress the locking pin 220. Once both propeller blades 270A, 270B have sufficiently rotated, the locking pin 220 is no longer restrained, and under force from the locking spring 260, the locking pin 220 returns to its rest position, engages the locking cutouts 290 with the locking taper 230, and holds the propeller blades 270A, 270B in their new states. The rotation-stop assembly 160 on the propeller base 130 contacts the propeller hubs 280 when the propeller blades 270A, 270B are in the folded state, and is configured to prevent the propeller blades 270A, 270B from being folded beyond the folded state.

FIG. 5A and FIG. 5B (SHEET 5/9) depict perspective views of rotatable propeller blades 270A, 270B of the rotatable-propeller assembly 120 of FIG. 2.

As depicted in FIG. 5, each of the rotatable propeller blades 270A, 270B include a proximal end (or end section). The proximal end defines a propeller mounting hole 305 extending through the proximal end. An outer facing peripheral edge (or end section) of the rotatable propeller blades 270A, 270B defines instances of a locking cutout 290 that are spaced apart from each other along an outer facing peripheral edge.

Each of the rotatable propeller blades 270A, 270B defines a propeller mounting hole 305, and an outer facing peripheral edge. The propeller mounting hole 305 extends through a proximal end (or end sections) of the rotatable propeller blades 270A, 270B. The propeller mounting hole 305 is configured to operatively receive a respective instance of a propeller retaining screw 360 (as depicted in FIGS. 2 and 3) that extends into a respective instance of the mounting screw holes 190 of the propeller base 130. The outer facing peripheral edge (or end section) defines instances of a locking cutout 290 that are spaced apart from each, and that are also positioned along an outer facing peripheral edge of the proximal end of the rotatable propeller blades 270A, 270B. The instances of the locking cutout 290 are positioned proximate to the propeller mounting hole 305.

Referring to FIGS. 5A and 5B, the switch between the folded state (FIG. 4) and the extended state (FIG. 2) is made easier through the lead-in features 300 optionally formed around each locking cutout 290, in some embodiments. The lead-in features 300 are most clearly shown in FIG. 5A and FIG. 5B as chamfers, though depending on the embodiment, these features may be chamfers, fillets or some other similar feature. They may also be absent in some embodiments. When they are present, the lead-in features 300 act to pull the propeller blade 270A, 270B into alignment such that the locking pin 220 can engage the locking cutout 290, under the force of the locking taper 230 (under force from the locking spring 260) engaging the lead-in feature 300.

Referring to FIG. 5A and FIG. 5B, in accordance with an example, the propeller blade 270A, 270B includes a combination of a propeller hub 280, locking cutouts 290, lead-in features 300, a propeller mounting hole 305, a retaining plate 320 (as depicted in FIG. 3 and FIG. 4). The propeller hub 280 is fastened rotatably near the first end to a propeller mounting pin 170 about the propeller mounting hole 305 of the propeller hub 280 and, at the second end, fastened to or formed into a propeller blade 270A, 270B. The locking cutouts 290 are formed along the edge of the propeller hub 280. The lead-in features 300 are formed along the edge of the propeller hub 280. The propeller mounting hole 305 is formed within the propeller hub 280. The propeller blade 270A, 270B is located at the first end and is formed into or fastened to a second end of the propeller hub 280. The retaining plate 320 is held unmovingly on the propeller mounting pins 170 against the thrust washers 350 by the propeller retaining screws 360.

FIG. 6A, FIG. 6B, FIG. 6C, and FIG. 6D (SHEET 6/9) depict isometric views of a propeller base 130 for the rotatable-propeller assembly 120 of FIG. 2.

Figure 6D:
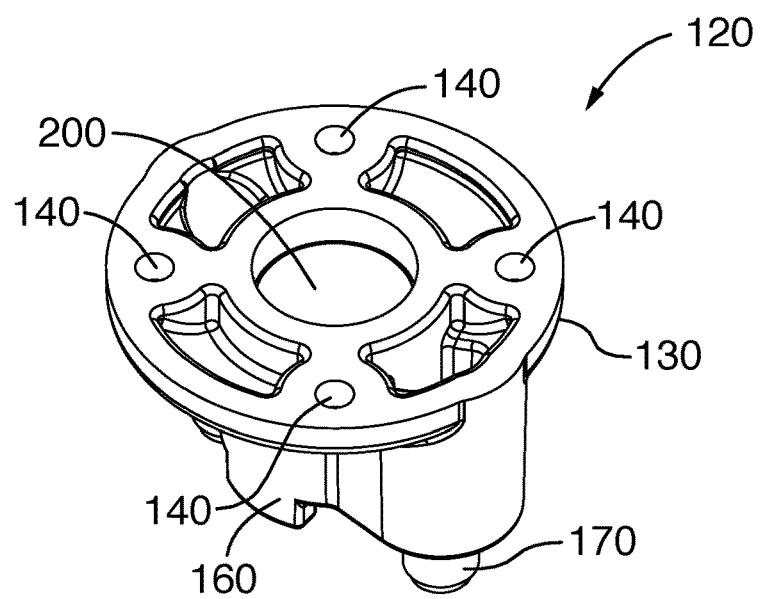
FIG. 6D (SHEET 6/9) is an isometric view of the second side of an embodiment of the propeller base 130 of FIG. 6A.

As depicted in FIG. 6A, the vehicle 100 further includes the propeller base 130. The propeller base 130 defines (provides) a base spring pocket 200 (as depicted in FIG. 6D), propeller mounting pins 170, and mounting screw holes 190. The base spring pocket 200 extends through the propeller base 130. The propeller mounting pins 170 extend from the propeller base 130. The propeller mounting pins 170 are spaced apart from each other. The mounting screw holes 190 extend through the propeller base 130. The mounting screw holes 190 also extend through a respective instance of the propeller mounting pins 170. The mounting screw holes 190 are spaced apart from each other. The mounting screw holes 190 are fixedly positioned on the opposite sides of the base spring pocket 200.

Referring to FIG. 6A, FIG. 6B, FIG. 6C and FIG. 6D, in accordance with an example, the propeller base 130 includes a combination of a propeller base mounting platform 135, motor mounting holes 140, an offset propeller mounting plane 150, a base pin hole 155, a rotation-stop assembly 160, propeller mounting pins 170, plate retaining bosses 180, mounting screw holes 190, a base spring pocket 200, and a pocket retaining lip 210, and a locking pin 220 (as depicted in FIG. 7A, FIG. 7B and FIG. 7C). The propeller base mounting platform 135 is formed on the propeller base 130. The motor mounting holes 140 are formed on the propeller base mounting platform 135 of the propeller base 130. The offset propeller mounting plane 150 is formed as a surface raised away from the propeller base mounting platform 135. The base pin hole 155 is formed on the offset propeller mounting plane 150 at one end of the base spring pocket 200. The rotation-stop assembly 160 is formed as features on the offset propeller mounting plane 150. The propeller mounting pins 170 are formed as features on the propeller base 130. The plate retaining bosses 180 are formed at the first ends of the propeller mounting pins 170. The mounting screw holes 190 are formed inside the propeller mounting pin 170. The base spring pocket 200 is formed as a cavity within the propeller base 130. The pocket retaining lip 210 is formed as a feature at the first end of the base spring pocket 200. The locking pin 220 (as depicted in FIGS. 7A to 7C) is held movably within the base spring pocket 200 and at the first end of the locking spring 260.

FIG. 7A, FIG. 7B, and FIG. 7C (SHEET 7/9) depict views of an example of a blade-lock assembly 212 for the rotatable-propeller assembly 120 of FIG. 2.

As depicted in FIG. 7A, the blade-lock assembly 212 includes a locking pin 220, and a locking taper 230. The locking pin 220 is configured to be slide receivable with the locking pin guide hole 340 of the retaining plate 320 (depicted in FIG. 8). The locking taper 230 is provided by the locking pin 220. The locking taper 230 has a shape conforming to the shape of the locking cutout 290 of the rotatable propeller blades 270A, 270B (depicted in FIG. 5A and FIG. 5B). FIG. 7B is a cross section taken along line A-A of FIG. 7A.

Referring to FIG. 7A. FIG. 7B and FIG. 7C, the locking pin 220 comprises: a pin head 225, a locking taper 230, a pin retaining lip 240, a pin spring pocket 250, a locking spring 260 (as depicted in FIG. 3 and FIG. 9). The pin head 225 is formed on the second end of the locking pin 220. The locking taper 230 is formed on the surface of the locking pin 220. The pin retaining lip 240 is formed at the first end of the locking pin 220. The pin spring pocket 250 is formed as a cavity within the locking pin 220. The locking spring 260 is held movably within the pin spring pocket 250 at the first end and held against the rotor assembly 115 at the second end, propeller blades 270A, 270B, each attached rotatably at the first end to a propeller mounting pin 170.

FIG. 8 (SHEET 8/9) depicts a perspective isometric view of a retaining plate 320 for the rotatable-propeller assembly 120 of FIG. 2.

The vehicle 100 further includes a retaining plate 320. The retaining plate 320 is to be fixedly positioned on one side of the rotatable propeller blades 270A, 270B (as depicted in FIG. 2, FIG. 3, and FIG. 4). More specifically, the retaining plate 320 is to be fixedly connected to the propeller base 130. As depicted in FIG. 8, the retaining plate 320 defines a locking pin guide hole 340, and boss holes 330. The locking pin guide hole 340 extends through the retaining plate 320. The locking pin guide hole 340 is aligned with the base spring pocket 200 of the propeller base 130. The boss holes 330 extend through the retaining plate 320. The boss holes 330 are fixedly positioned and are spaced apart from the locking pin guide hole 340. Each boss hole 330 is aligned with a respective instance of the mounting screw holes 190 of the propeller base 130.

Referring to FIG. 8, the retaining plate 320 comprises: boss holes 330, a locking pin guide hole 340, a thrust washer 350 (as depicted in FIG. 3), propeller retaining screws 360, a thrust washer 350. The boss holes 330 are formed in the retaining plate 320. The locking pin guide hole 340 is formed in the retaining plate 320. The thrust washer 350 is held rotatably between the retaining plate 320 and the propeller hubs 280. The propeller retaining screws 360 are each fastened through the retaining plate 320, the thrust washer 350, the propeller mounting hole 305 and into the propeller mounting pins 170.

FIG. 9A and FIG. 9B (SHEET 9/9) depict cross-sectional view of the rotatable-propeller assembly 120 of FIG. 2 in a lock position 910 and an unlock position 912, respectively.

With reference to FIG. 9A, the blade-lock assembly 212 is configured to selectively move along a central-rotation axis 278 towards the retaining plate 320 to a lock position 910 in which a clamping force 914 is transmitted across opposite sides of the rotatable propeller blades 270A, 270B, and the rotatable propeller blades 270A, 270B become fixedly connected together as a single unit. FIG. 2 depicted the blade-deployment position 900. FIG. 4 depicts the blade-storage position 902.

In accordance with a specific option, in the lock position 910, the rotatable propeller blades 270A, 270B contact the locking pin 220 of the blade-lock assembly 212 and contact the retaining plate 320 in such a way that the locking pin 220 and the retaining plate 320 transmit the clamping force 914 across the opposite sides of the rotatable propeller blades 270A, 270B to maintain a fixed-blade orientation of the rotatable propeller blades 270A, 270B relative to each other in such a way that the rotatable propeller blades 270A, 270B are rotatable about the central-rotation axis 278 once the rotatable propeller blades 270A, 270B are fixedly locked together (as depicted in FIG. 2).

In accordance with a specific option, in the unlock position 912 fixed-blade orientation of the rotatable propeller blades 270A, 270B is not maintained relative to each other in such a way that each of the rotatable propeller blades 270A, 270B is independently rotatable about a respective instance of a spaced-apart blade-mounting axis 274A, 274B once the rotatable propeller blades 270A, 270B are fixedly unlocked from each other; in this manner, the rotatable propeller blades 270A, 270B may be movable between the fixed positions depicted in FIG. 2 and in FIG. 4.

In accordance with a specific option, in the lock position 910, the clamping force 914 is transmitted from the locking taper 230 and the retaining plate 320 toward the locking cutout 290 provided by each of the rotatable propeller blades 270A, 270B.

With reference to FIG. 9B, the blade-lock assembly 212 includes: (A) a retaining plate 320 fixedly positioned on one side of the rotatable propeller blades 270A, 270B, and (B) a locking pin 220 oriented along a central-rotation axis 278 of the rotatable propeller blades 270A, 270B. The locking pin 220 is configured to selectively move along the central-rotation axis 278 towards the retaining plate 320 to a lock position 910 in which the clamping force 914 is transmitted across opposite sides of the rotatable propeller blades 270A, 270B, and the rotatable propeller blades 270A, 270B become fixedly connected together as a single unit. As well, the locking pin 220 is configured to selectively move away from the retaining plate 320 to an unlock position 912 in which the clamping force 914 is not transmitted across the opposite sides of the rotatable propeller blades 270A, 270B, and the rotatable propeller blades 270A, 270B become disconnected from each other into separate units.

In accordance with a specific option, in the unlock position 912: the rotatable propeller blades 270A, 270B do not contact the locking pin 220 in such a way that the locking pin 220 and the retaining plate 320 do not transmit the clamping force 914 across the opposite sides of the rotatable propeller blades 270A, 270B so that the fixed-blade orientation of the rotatable propeller blades 270A, 270B is not maintained relative to each other in such a way that each of the rotatable propeller blades 270A, 270B is independently rotatable about a respective instance of a spaced-apart blade-mounting axis 274A, 274B once the rotatable propeller blades 270A, 270B are fixedly unlocked from each other.

In accordance with a specific option, in the lock position 910 fixed-blade orientation of the rotatable propeller blades 270A, 270B is maintained relative to each other in such a way that the rotatable propeller blades 270A, 270B are rotatable about the central-rotation axis 278 once the rotatable propeller blades 270A, 270B are fixedly locked together. The clamping force 914 is transmitted from the central-rotation axis 278 toward the respective instance of the spaced-apart blade-mounting axis 274A, 274B.

In accordance with an option for FIG. 9A and FIG. 9B, in the unlock position 912, the clamping force 914 is not transmitted from the locking taper 230 and the retaining plate 320 toward the locking cutout 290 provided by each of the rotatable propeller blades 270A, 270B; in the lock position 910, the clamping force 914 is transmitted from the central-rotation axis 278 toward the respective instance of the spaced-apart blade-mounting axis 274A, 274B.

In accordance with another option for FIG. 9A and FIG. 9B, in the lock position 910, the clamping force 914 is transmitted from the locking taper 230 and the retaining plate 320 toward the locking cutout 290 provided by the rotatable propeller blades 270A, 270B; in the unlock position 912, the clamping force 914 is not transmitted from the locking taper 230 and the retaining plate 320 toward the locking cutout 290 provided by the rotatable propeller blades 270A, 270B.

In view of the foregoing, the various aspects and various embodiments of the HUAV 102 of FIG. 1, and the propeller assembly 120 may have a number of possible advantages (either individually or in combination) over prior (known) propeller systems:

Technical advantage (A): it is an advantage for the HUAV 102 to be more easily packed and shipped.

Technical advantage (B): it is an advantage for the propeller blades 270A, 270B of the HUAV 102 to be foldable.

Technical advantage (C); it is an advantage for the propeller blades 270A, 270B of the HUAV 102 to fold in such a way that they are better protected from breakage during packing and shipping.

Technical advantage (D): it is an advantage for the propeller blades 270A, 270B of the HUAV 102 to be securely mounted to the UAV even during packing and shipping, to reduce the possibility of loss or misplacement of the propeller assembly 120.

Technical advantage (E): it is an advantage for the propeller blades 270A, 270B of the HUAV 102 to not require re-mounting or re-alignment before use, as may be required with removable instances of the propeller blades 270A, 270B.

Technical advantage (F): it is an advantage for the instances of the propeller assembly 120 of the HUAV 102 to always be mounted to the correct instances of the propeller arm 105.

Technical advantage (G): it is an advantage for the propeller assembly 120 of the HUAV 102 to be easily switchable from a packing- or shipping-optimized orientation to a flight-ready orientation without the use of any additional tools.

Technical advantage (H): it is an advantage for the propeller assembly 120 of the HUAV 102 to audibly and/or tactilely indicate when they have been fully switched from a packing- or shipping-optimized orientation to a flight-ready orientation.

Technical advantage (I): it is an advantage for the propeller blades 270A, 270B of the HUAV 102 to remain rigidly extended in the flight-ready orientation during operation, irrespective of the rotational speed of the propeller blades 270A, 270B.

The following clauses are offered as further description of the examples of the vehicle 100. Any one or more of the following clauses may be combinable with any another one or more of the following clauses. Any one of the following clauses may stand on its own merit without having to be combined with another other of the clauses. Clause (1): a vehicle 100 of any clause mentioned in this paragraph, the vehicle 100 further comprising: a rotatable-propeller assembly 120 including rotatable propeller blades 270A, 270B; and a blade-lock assembly 212 being cooperative with the rotatable propeller blades 270A, 270B, and the blade-lock assembly 212 being configured to selectively lockably fixedly connect the rotatable propeller blades 270A, 270B together by application of a clamping force 914 to the rotatable propeller blades 270A, 270B, and the blade-lock assembly 212 also being configured to selectively lockably disconnect the rotatable propeller blades 270A, 270B from each other by removal of the clamping force 914 from the rotatable propeller blades 270A, 270B. Clause (2): the vehicle 100 of any clause mentioned in this paragraph, wherein: the blade-lock assembly 212 is further configured to selectively lockably fixedly connect the rotatable propeller blades 270A, 270B together in such a way that the rotatable propeller blades 270A, 270B are lockably fixedly positionable in any one of a blade-deployment position 900 and a blade-storage position 902. Clause (3): the vehicle 100 of any clause mentioned in this paragraph, wherein: the blade-lock assembly 212 is further configured to selectively lockably disconnect the rotatable propeller blades 270A, 270B from each other in such a way that the rotatable propeller blades 270A, 270B are rotatable independently of each other between a blade-deployment position 900 and a blade-storage position 902. Clause (4): the vehicle 100 of any clause mentioned in this paragraph, wherein: the blade-lock assembly 212 is further configured to fixedly lock and maintain fixed-blade orientation of the rotatable propeller blades 270A, 270B relative to each other in such a way that the rotatable propeller blades 270A, 270B are rotatable about a central-rotation axis 278 once the rotatable propeller blades 270A, 270B are fixedly locked together by the blade-lock assembly 212. Clause (5): the vehicle 100 of any clause mentioned in this paragraph, wherein: the blade-lock assembly 212 is further configured to fixedly unlock and not maintain fixed-blade orientation of the rotatable propeller blades 270A, 270B relative to each other in such a way that each of the rotatable propeller blades 270A, 270B is independently rotatable about a respective instance of a spaced-apart blade-mounting axis 274A, 274B once the rotatable propeller blades 270A, 270B are fixedly unlocked from each other by the blade-lock assembly 212. Clause (6A): a vehicle 100 of any clause mentioned in this paragraph, the vehicle 100, wherein each of the rotatable propeller blades 270A, 270B is configured to rotate about a central-rotation axis 278 whether the rotatable propeller blades 270A, 270B are in a condition of being: (A) locked relative to each other, and (B) not locked relative to each other. Clause (6B): a vehicle 100 of any clause mentioned in this paragraph, the vehicle 100, wherein each of the rotatable propeller blades 270A, 270B is configured to rotate about a respective instance of a spaced-apart blade-mounting axis 274A, 274B if and only if the rotatable propeller blades 270A, 270B are fixedly unlocked relative to each other. Clause (6C): a vehicle 100 of any clause mentioned in this paragraph, the vehicle 100, wherein each of the rotatable propeller blades 270A, 270B is configured to rotate about a central-rotation axis 278 whether the rotatable propeller blades 270A, 270B are in a condition of being: (A) locked relative to each other, and (B) not locked relative to each other; and to rotate about a respective instance of a spaced-apart blade-mounting axis 274A, 274B if and only if the rotatable propeller blades 270A, 270B are fixedly unlocked relative to each other. Clause (7): the vehicle 100 of any clause mentioned in this paragraph, wherein: the central-rotation axis 278 is geometrically positioned between respective instances of the spaced-apart blade-mounting axis 274A, 274B. Clause (8): a vehicle 100 of any clause mentioned in this paragraph, the vehicle 100, wherein the central-rotation axis 278 and each respective instance of the spaced-apart blade-mounting axis 274A, 274B extend in a co-parallel orientation. Clause (9): the vehicle 100 of any clause mentioned in this paragraph, wherein: the blade-lock assembly 212 is configured to fixedly lock orientation of the rotatable propeller blades 270A, 270B in any one of a locked in-line fixed-blade orientation 214 and a locked off-line fixed-blade orientation 216. Clause (10): the vehicle 100 of any clause mentioned in this paragraph, wherein: the blade-lock assembly 212 is configured to fixedly lock orientation of the rotatable-propeller assembly 120 in a first lock mode; and in the first lock mode, the blade-lock assembly 212 fixedly locks orientation of the rotatable-propeller assembly 120 in such a way that the rotatable propeller blades 270A, 270B are lockably fixedly positioned to extend locked in-line relative to each other in a locked in-line fixed-blade orientation 214. Clause (11): a vehicle 100 of any clause mentioned in this paragraph, the vehicle 100, wherein in the locked in-line fixed-blade orientation 214, the rotatable propeller blades 270A, 270B are lockably fixedly positioned longitudinally lengthwise with proximal edges (or end sections) facing each other, and extend along a longitudinal blade-extension line 215. Clause (12): the vehicle 100 of any clause mentioned in this paragraph, wherein: the blade-lock assembly 212 is configured to fixedly lock orientation of the rotatable-propeller assembly 120 in a second lock mode; and in the second lock mode, the blade-lock assembly 212 fixedly locks orientation of the rotatable-propeller assembly 120 in such a way that the rotatable propeller blades 270A, 270B are lockably fixedly positioned to extend fixedly locked off-line relative to each other in a locked off-line fixed-blade orientation 216. Clause (13): the vehicle 100 of any clause mentioned in this paragraph, wherein: in the locked off-line fixed-blade orientation 216, the rotatable propeller blades 270A, 270B are lockably fixedly positioned parallel relative to each other, and are spaced apart from each other. Clause (14): the vehicle 100 of any clause mentioned in this paragraph, wherein: the blade-lock assembly 212 is configured to fixedly lock orientation of the rotatable-propeller assembly 120 in a first lock mode; the blade-lock assembly 212 is configured to fixedly lock orientation of the rotatable-propeller assembly 120 in a second lock mode; and in the first lock mode, the blade-lock assembly 212 fixedly locks orientation of the rotatable-propeller assembly 120 in such a way that the rotatable propeller blades 270A, 270B are lockably fixedly positioned to extend locked in-line relative to each other in a locked in-line fixed-blade orientation 214; and in the second lock mode, the blade-lock assembly 212 fixedly locks orientation of the rotatable-propeller assembly 120 in such a way that the rotatable propeller blades 270A, 270B are lockably fixedly positioned to extend locked off-line relative to each other in a locked off-line fixed-blade orientation 216. Clause (15): a vehicle 100 of any clause mentioned in this paragraph, the vehicle 100, wherein in the locked in-line fixed-blade orientation 214, the rotatable propeller blades 270A, 270B are lockably fixedly positioned longitudinally lengthwise with the proximal edges (or end sections) facing each other, and extend along the longitudinal blade-extension line 215; and in the locked off-line fixed-blade orientation 216, the rotatable propeller blades 270A, 270B are lockably fixedly positioned parallel relative to each other, and are spaced apart from each other. Clause (16): a vehicle 100 of any clause mentioned in this paragraph, the vehicle 100, wherein the rotatable propeller blades 270A, 270B each includes end-mountable portions 271, and each of the end-mountable portions 271 is pivotally mountable at the respective instance of the spaced-apart blade-mounting axes 274A, 274B that extend parallel to each other, and are spaced apart from each other; and in a locked in-line fixed-blade orientation 214, the rotatable propeller blades 270A, 270B are: not pivotally rotatable about each of the respective instances of the spaced-apart blade-mounting axis 274A, 274B; and pivotally rotatable about the central-rotation axis 278 that is geometrically positioned between the respective instances of the spaced-apart blade-mounting axis 274A, 274B, and the central-rotation axis 278 and the respective instances of the spaced-apart blade-mounting axis 274A, 274B extend in the co-parallel orientation. Clause (17): the vehicle 100 of any clause mentioned in this paragraph, wherein: the blade-lock assembly 212 is further configured to permit unlocked relative movement of the rotatable propeller blades 270A, 270B between a locked in-line fixed-blade orientation 214 and a locked off-line fixed-blade orientation 216, and during relative movement, the rotatable propeller blades 270A, 270B are: pivotally rotatable about each of the respective instance of the spaced-apart blade-mounting axis 274A, 274B; and not pivotally rotatable about the central-rotation axis 278 that is geometrically positioned between the respective instances of the spaced-apart blade-mounting axis 274A, 274B, and the central-rotation axis 278 and the respective instances of the spaced-apart blade-mounting axis 274A, 274B extend in a co-parallel orientation. Clause (18): a vehicle 100 of any clause mentioned in this paragraph, the vehicle 100, wherein in a blade-deployment position 900, the rotatable propeller blades 270A, 270B are lockably fixedly positioned to extend locked in-line relative to each other, longitudinally lengthwise with proximal edges (or end sections) facing each other, and to extend along a longitudinal blade-extension line 215; and in a blade-storage position 902, the rotatable propeller blades 270A, 270B are lockably fixedly positioned to extend parallel relative to each other, and are spaced apart from each other in an off-line arrangement. Clause (19): a vehicle 100 of any clause mentioned in this paragraph, the vehicle 100, wherein in a blade-deployment position 900, the rotatable propeller blades 270A, 270B are lockably fixedly positioned to extend locked in-line relative to each other, longitudinally lengthwise with proximal edges (or end sections) facing each other, and extend along a longitudinal blade-extension line 215; and in a blade-storage position 902, the rotatable propeller blades 270A, 270B are lockably fixedly positioned to extend parallel relative to each other in an off-line arrangement, and are spaced apart from each other, and the rotatable propeller blades 270A, 270B are also positioned adjacent to each other in a side-by-side relationship. Clause (20): a vehicle 100 of any clause mentioned in this paragraph, the vehicle 100, wherein in a blade-storage position 902, the rotatable propeller blades 270A, 270B are lockably fixedly positioned to extend parallel relative to each other in an off-line arrangement, and are spaced apart from each other, and the rotatable propeller blades 270A, 270B are also fixedly positioned adjacent to each other in a side-by-side relationship. Clause (21): the vehicle 100 of any clause mentioned in this paragraph, further comprising: a vehicle body 104; a propeller arm 105 extending supportably outward from the vehicle body 104; a propeller motor 110 being received supportably by the propeller arm 105; a rotor assembly 115 being mounted supportably in the propeller motor 110; a propeller base 130 being connected fixedly to the rotor assembly 115, and the propeller base 130 extending axially from the rotor assembly 115, and the propeller base 130 being configured to: support rotation of the rotatable propeller blades 270A, 270B; and support the blade-lock assembly 212 relative to the rotatable propeller blades 270A, 270B. Clause (22): the vehicle 100 of any clause mentioned in this paragraph, further comprising: a propeller base 130, wherein: the rotatable-propeller assembly 120 extends outwardly radially from the propeller base 130; for the case where the blade-lock assembly 212 locks the rotatable propeller blades 270A, 270B together: the rotatable-propeller assembly 120 is configured to rotate along a rotation plane having a central-rotation axis 278 extending orthogonally through the rotation plane, and also extending orthogonally through the propeller base 130; and the rotatable propeller blades 270A, 270B extend radially from the central-rotation axis 278; and for the case where the blade-lock assembly 212 does not lock the rotatable propeller blades 270A, 270B together: each of the rotatable propeller blades 270A, 270B are pivotally movable to the propeller base 130 at a respective instance of a spaced-apart blade-mounting axis 274A, 274B extending radially through the propeller base 130. Clause (23): a vehicle 100 of any clause mentioned in this paragraph, the vehicle 100, wherein the blade-lock assembly 212 includes: a retaining plate 320 being fixedly positioned on one side of the rotatable propeller blades 270A, 270B; and a locking pin 220 being oriented along a central-rotation axis 278 of the rotatable propeller blades 270A, 270B, and the locking pin 220 being configured to: selectively move along the central-rotation axis 278 towards the retaining plate 320 to a lock position 910 in which the clamping force 914 is transmitted across opposite sides of the rotatable propeller blades 270A, 270B, and the rotatable propeller blades 270A, 270B become fixedly connected together as a single unit; and selectively move away from the retaining plate 320 to an unlock position 912 in which the clamping force 914 is not transmitted across the opposite sides of the rotatable propeller blades 270A, 270B, and the rotatable propeller blades 270A, 270B become disconnected from each other into separate units. Clause (24): a vehicle 100 of any clause mentioned in this paragraph, the vehicle 100, wherein in the lock position 910: the rotatable propeller blades 270A, 270B contact the blade-lock assembly 212 and contact the retaining plate 320 in such a way that the locking pin 220 and the retaining plate 320 transmit the clamping force 914 across the opposite sides of the rotatable propeller blades 270A, 270B to maintain a fixed-blade orientation of the rotatable propeller blades 270A, 270B relative to each other in such a way that the rotatable propeller blades 270A, 270B are rotatable about the central-rotation axis 278 once the rotatable propeller blades 270A, 270B are fixedly locked together; and in the unlock position 912: the rotatable propeller blades 270A, 270B do not contact the locking pin 220 in such a way that the locking pin 220 and the retaining plate 320 do not transmit the clamping force 914 across the opposite sides of the rotatable propeller blades 270A, 270B so that the fixed-blade orientation of the rotatable propeller blades 270A, 270B is not maintained relative to each other in such a way that each of the rotatable propeller blades 270A, 270B is independently rotatable about a respective instance of a spaced-apart blade-mounting axis 274A, 274B once the rotatable propeller blades 270A, 270B are fixedly unlocked from each other. Clause (25): the vehicle 100 of any clause mentioned in this paragraph, wherein: in the unlock position 912: fixed-blade orientation of the rotatable propeller blades 270A, 270B is not maintained relative to each other in such a way that each of the rotatable propeller blades 270A, 270B is independently rotatable about a respective instance of a spaced-apart blade-mounting axis 274A, 274B once the rotatable propeller blades 270A, 270B are fixedly unlocked from each other; and in the lock position 910: fixed-blade orientation of the rotatable propeller blades 270A, 270B is maintained relative to each other in such a way that the rotatable propeller blades 270A, 270B are rotatable about the central-rotation axis 278 once the rotatable propeller blades 270A, 270B are fixedly locked together; and the clamping force 914 is transmitted from the central-rotation axis 278 toward the respective instance of the spaced-apart blade-mounting axis 274A, 274B. Clause (26): a vehicle 100 of any clause mentioned in this paragraph, the vehicle 100, wherein each of the rotatable propeller blades 270A, 270B include: a proximal end defining a propeller mounting hole 305 extending through the proximal end; and an outer facing peripheral edge (or end sections) defining instances of a locking cutout 290 being spaced apart from each other along an outer facing peripheral edge; and the blade-lock assembly 212 includes: a locking taper 230 having a shape conforming to the shape of the locking cutout 290; and in the lock position 910, the clamping force 914 is transmitted from the locking taper 230 and the retaining plate 320 toward the locking cutout 290 provided by each of the rotatable propeller blades 270A, 270B; and in the unlock position 912, the clamping force 914 is not transmitted from the locking taper 230 and the retaining plate 320 toward the locking cutout 290 provided by each of the rotatable propeller blades 270A, 270B. Clause (27): the vehicle 100 of any clause mentioned in this paragraph, further comprising: a propeller base 130 defining: a base spring pocket 200 extending through the propeller base 130; propeller mounting pins 170 extending from the propeller base 130, and the propeller mounting pins 170 being spaced apart from each other; and mounting screw holes 190 extending through the propeller base 130, and the mounting screw holes 190 also extending through a respective instance of the propeller mounting pins 170, and the mounting screw holes 190 being spaced apart from each other, and the mounting screw holes 190 being fixedly positioned on the opposite sides of the base spring pocket 200. Clause (28): the vehicle 100 of any clause mentioned in this paragraph, wherein: the retaining plate 320 defines: a locking pin guide hole 340 extending through the retaining plate 320, and the locking pin guide hole 340 being aligned with the base spring pocket 200 of the propeller base 130; and boss holes 330 extending through the retaining plate 320, and the boss holes 330 being fixedly positioned and being spaced apart from the locking pin guide hole 340, and the boss holes 330 being aligned with a respective instance of the mounting screw holes 190 of the propeller base 130. Clause (29): a vehicle 100 of any clause mentioned in this paragraph, the vehicle 100, wherein each of the rotatable propeller blades 270A, 270B defines: a propeller mounting hole 305 extending through a proximal end of the rotatable propeller blades 270A, 270B, and the propeller mounting hole 305 being configured to operatively receive a respective instance of a propeller retaining screw 360 that extends into a respective instance of the mounting screw holes 190 of the propeller base 130; and an outer facing peripheral edge (or end section) defining instances of a locking cutout 290 being spaced apart from each and also being positioned other along an outer facing peripheral edge of the proximal end of the rotatable propeller blades 270A, 270B, and the instances of the locking cutout 290 being positioned proximate to the propeller mounting hole 305.

Clause (30): the vehicle 100 of any clause mentioned in this paragraph, wherein: the blade-lock assembly 212 includes: a locking pin 220 being configured to be slide receivable with the locking pin guide hole 340 of the retaining plate 320; and a locking taper 230 being provided by the locking pin 220, and the locking taper 230 having a shape conforming to the shape of the locking cutout 290 of the rotatable propeller blades 270A, 270B. Clause (31): the vehicle 100 of any clause mentioned in this paragraph, wherein: in the lock position 910, the clamping force 914 is transmitted from the locking taper 230 and the retaining plate 320 toward the locking cutout 290 provided by the rotatable propeller blades 270A, 270B; and in the unlock position 912, the clamping force 914 is not transmitted from the locking taper 230 and the retaining plate 320 toward the locking cutout 290 provided by the rotatable propeller blades 270A, 270B. Clause (32): the vehicle 100 of any clause mentioned in this paragraph, wherein: in the lock position 910, the clamping force 914 is transmitted from the central-rotation axis 278 toward the respective instance of the spaced-apart blade-mounting axis 274A, 274B. Clause (33): the vehicle 100 of any clause mentioned in this paragraph, further comprising: a locking spring 260 contained, at least in part, in the propeller base 130, and the locking spring 260 being interactive with the locking pin 220, and the locking spring 260 being configured to provide the clamping force 914 to the locking pin 220. Clause (34): the vehicle 100 of any clause mentioned in this paragraph, further comprising: a propeller motor 110; and a rotor assembly 115 being operatively supported by the propeller motor 110, and the rotor assembly 115 being fixedly coupled to the propeller base 130 in such a way that in response to actuation of the propeller motor 110, the rotor assembly 115 and the propeller base 130 and the rotatable-propeller assembly 120 are rotatable, and the rotatable-propeller assembly 120 is configured to propel the vehicle 100. Clause (35): the vehicle 100 of any clause mentioned in this paragraph, further comprising: an propeller arm 105 operatively supporting the propeller motor 110; and a vehicle body 104 supporting the propeller arm 105. Clause (36): a vehicle 100 of any clause mentioned in this paragraph, the vehicle 100, wherein in a blade-storage position 902, the rotatable propeller blades 270A, 270B are lockably fixedly positioned to extend parallel relative to each other in an off-line arrangement, and are spaced apart from each other, and the rotatable propeller blades 270A, 270B are also fixedly positioned adjacent to each other in a side-by-side relationship. Clause (37): the vehicle 100 of any clause mentioned in this paragraph, further comprising: a vehicle body 104 extending from a hovering unmanned aerial vehicle 102; the rotatable-propeller assembly 120 is fixedly positioned relative to the vehicle body 104; and the blade-lock assembly 212 is fixedly positioned relative to the vehicle body 104. Clause (38): the vehicle 100 of any clause mentioned in this paragraph, wherein for the case where the propeller blades 270A, 270B are not locked in a storage position, and the propeller blades 270A, 270B are urged into a deployed position, the propeller blades 270A, 270B become locked, by the blade-lock assembly 212, in the deployed position without operator assistance.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, or components, that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. An unmanned aerial vehicle, comprising:
a rotatable-propeller assembly including rotatable propeller blades; and
a blade-lock assembly being cooperative with the rotatable propeller blades, and the blade-lock assembly being configured to selectively lockably fixedly connect the rotatable propeller blades together by application of a clamping force to the rotatable propeller blades, and the blade-lock assembly also being configured to selectively lockably disconnect the rotatable propeller blades from each other by removal of the clamping force from the rotatable propeller blades;
wherein the blade-lock assembly includes:
a retaining plate being fixedly positioned on one side of the rotatable propeller blades; and
a locking pin being oriented along a central-rotation axis of the rotatable propeller blades, and the locking pin being configured to:
selectively move along the central-rotation axis towards the retaining plate to a lock position in which the clamping force is transmitted across opposite sides of the rotatable propeller blades, and the rotatable propeller blades become fixedly connected together as a single unit; and
selectively move away from the retaining plate to an unlock position in which the clamping force is not transmitted across the opposite sides of the rotatable propeller blades, and the rotatable propeller blades become disconnected from each other into separate units.

2. The unmanned aerial vehicle of claim 1, wherein:
the blade-lock assembly is further configured to selectively lockably fixedly connect the rotatable propeller blades together in such a way that the rotatable propeller blades are lockably fixedly positionable in any one of a blade-deployment position and a blade-storage position.

3. The unmanned aerial vehicle of claim 1, wherein:
the blade-lock assembly is further configured to selectively lockably disconnect the rotatable propeller blades from each other in such a way that the rotatable propeller blades are rotatable independently of each other between a blade-deployment position and a blade-storage position.

4. The unmanned aerial vehicle of claim 1, wherein:
the blade-lock assembly is further configured to fixedly lock and maintain fixed-blade orientation of the rotatable propeller blades relative to each other in such a way that the rotatable propeller blades are rotatable about a central-rotation axis once the rotatable propeller blades are fixedly locked together by the blade-lock assembly.

5. The unmanned aerial vehicle of claim 1, wherein:
the blade-lock assembly is further configured to fixedly unlock and not maintain fixed-blade orientation of the rotatable propeller blades relative to each other in such a way that each of the rotatable propeller blades is independently rotatable about a respective instance of a spaced-apart blade-mounting axis once the rotatable propeller blades are fixedly unlocked from each other by the blade-lock assembly.

6. The unmanned aerial vehicle of claim 1, wherein:
each of the rotatable propeller blades is configured to:
rotate about a central-rotation axis whether the rotatable propeller blades are in a condition of being: (A) locked relative to each other, and (B) not locked relative to each other.

7. The unmanned aerial vehicle of claim 1, wherein:
each of the rotatable propeller blades is configured to:
rotate about a respective instance of a spaced-apart blade-mounting axis if and only if the rotatable propeller blades are fixedly unlocked relative to each other.

8. The unmanned aerial vehicle of claim 1, wherein:
each of the rotatable propeller blades is configured to:
rotate about a central-rotation axis whether the rotatable propeller blades are in a condition of being: (A) locked relative to each other, and (B) not locked relative to each other; and
rotate about a respective instance of a spaced-apart blade-mounting axis if and only if the rotatable propeller blades are fixedly unlocked relative to each other.

9. The unmanned aerial vehicle of claim 8, wherein:
in the lock position, the clamping force is transmitted from the central-rotation axis toward a respective instance of a spaced-apart blade-mounting axis.

10. The unmanned aerial vehicle of claim 8, wherein:
the central-rotation axis is geometrically positioned between respective instances of the spaced-apart blade-mounting axis.

11. The unmanned aerial vehicle of claim 8, wherein:
the central-rotation axis and each respective instance of the spaced-apart blade-mounting axis extend in a co-parallel orientation.

12. The unmanned aerial vehicle of claim 11, wherein:
the rotatable propeller blades each includes end-mountable portions, and each of the end-mountable portions is pivotally mountable at the respective instance of the spaced-apart blade-mounting axes that extend parallel to each other, and are spaced apart from each other; and
in a locked in-line fixed-blade orientation, the rotatable propeller blades are:
not pivotally rotatable about each of the respective instances of the spaced-apart blade-mounting axis; and
pivotally rotatable about the central-rotation axis that is geometrically positioned between the respective instances of the spaced-apart blade-mounting axis, and the central-rotation axis and the respective instances of the spaced-apart blade-mounting axis extend in the co-parallel orientation.

13. The unmanned aerial vehicle of claim 11, wherein:
the blade-lock assembly is further configured to permit unlocked relative movement of the rotatable propeller blades between a locked in-line fixed-blade orientation and a locked off-line fixed-blade orientation, and
during relative movement, the rotatable propeller blades are:
pivotally rotatable about each of the respective instance of the spaced-apart blade-mounting axis; and
not pivotally rotatable about the central-rotation axis that is geometrically positioned between the respective instances of the spaced-apart blade-mounting axis, and the central-rotation axis and the respective instances of the spaced-apart blade-mounting axis extend in the co-parallel orientation.

14. The unmanned aerial vehicle of claim 1, wherein:
the blade-lock assembly is configured to fixedly lock orientation of the rotatable propeller blades in any one of a locked in-line fixed-blade orientation.

15. The unmanned aerial vehicle of claim 1, wherein:
the blade-lock assembly is configured to fixedly lock orientation of the rotatable-propeller assembly in a first lock mode; and
in the first lock mode, the blade-lock assembly fixedly locks orientation of the rotatable-propeller assembly in such a way that the rotatable propeller blades are lockably fixedly positioned to extend locked in-line relative to each other in a locked in-line fixed-blade orientation.

16. The unmanned aerial vehicle of claim 15, wherein:
in the locked in-line fixed-blade orientation, the rotatable propeller blades are lockably fixedly positioned longitudinally lengthwise with proximal edges facing each other, and extend along a longitudinal blade-extension line.

17. The unmanned aerial vehicle of claim 1, wherein:
the blade-lock assembly is configured to fixedly lock orientation of the rotatable-propeller assembly in a second lock mode; and
in the second lock mode, the blade-lock assembly fixedly locks orientation of the rotatable-propeller assembly in such a way that the rotatable propeller blades are lockably fixedly positioned to extend fixedly locked off-line relative to each other in a locked off-line fixed-blade orientation.

18. The unmanned aerial vehicle of claim 17, wherein:
in the locked off-line fixed-blade orientation, the rotatable propeller blades are lockably fixedly positioned parallel relative to each other, and are spaced apart from each other.

19. The unmanned aerial vehicle of claim 1, wherein:
the blade-lock assembly is configured to fixedly lock orientation of the rotatable-propeller assembly in a first lock mode;
the blade-lock assembly is configured to fixedly lock orientation of the rotatable-propeller assembly in a second lock mode; and
in the first lock mode, the blade-lock assembly fixedly locks orientation of the rotatable-propeller assembly in such a way that the rotatable propeller blades are lockably fixedly positioned to extend locked in-line relative to each other in a locked in-line fixed-blade orientation; and
in the second lock mode, the blade-lock assembly fixedly locks orientation of the rotatable-propeller assembly in such a way that the rotatable propeller blades are lockably fixedly positioned to extend locked off-line relative to each other in a locked off-line fixed-blade orientation.

20. The unmanned aerial vehicle of claim 19, wherein:
in the locked in-line fixed-blade orientation, the rotatable propeller blades are lockably fixedly positioned longitudinally lengthwise with the proximal edges facing each other, and extend along the longitudinal blade-extension line; and
in the locked off-line fixed-blade orientation, the rotatable propeller blades are lockably fixedly positioned parallel relative to each other, and are spaced apart from each other.

21. The unmanned aerial vehicle of claim 1, wherein:
in a blade-deployment position, the rotatable propeller blades are lockably fixedly positioned to extend locked in-line relative to each other, longitudinally lengthwise with proximal edges facing each other, and to extend along a longitudinal blade-extension line; and
in a blade-storage position, the rotatable propeller blades are lockably fixedly positioned to extend parallel relative to each other, and are spaced apart from each other in an off-line arrangement.

22. The unmanned aerial vehicle of claim 1, wherein:
in a blade-deployment position, the rotatable propeller blades are lockably fixedly positioned to extend locked in-line relative to each other, longitudinally lengthwise with proximal edges facing each other, and extend along a longitudinal blade-extension line; and
in a blade-storage position, the rotatable propeller blades are lockably fixedly positioned to extend parallel relative to each other in an off-line arrangement, and are spaced apart from each other, and the rotatable propeller blades are also positioned adjacent to each other in a side-by-side relationship.

23. The unmanned aerial vehicle of claim 1, wherein:
in a blade-storage position, the rotatable propeller blades are lockably fixedly positioned to extend parallel relative to each other in an off-line arrangement, and are spaced apart from each other, and the rotatable propeller blades are also fixedly positioned adjacent to each other in a side-by-side relationship.

24. The unmanned aerial vehicle of claim 1, further comprising:
a vehicle body;
a propeller arm extending supportably outward from the vehicle body;
a propeller motor being received supportably by the propeller arm;
a rotor assembly being mounted supportably in the propeller motor;
a propeller base being connected fixedly to the rotor assembly, and the propeller base extending axially from the rotor assembly, and
the propeller base being configured to:
support rotation of the rotatable propeller blades; and
support the blade-lock assembly relative to the rotatable propeller blades.

25. The unmanned aerial vehicle of claim 1, further comprising:
a propeller base, wherein:
the rotatable-propeller assembly extends outwardly radially from the propeller base;
for a case where the blade-lock assembly locks the rotatable propeller blades together:
the rotatable-propeller assembly is configured to rotate along a rotation plane having a central-rotation axis extending orthogonally through the rotation plane, and also extending orthogonally through the propeller base; and
the rotatable propeller blades extend radially from the central-rotation axis; and
for the case where the blade-lock assembly does not lock the rotatable propeller blades together:
each of the rotatable propeller blades are pivotally movable to the propeller base at a respective instance of a spaced-apart blade-mounting axis extending radially through the propeller base.

26. The unmanned aerial vehicle of claim 1, wherein:
in a lock position:
the rotatable propeller blades contact the locking pin of the blade-lock assembly and contact the retaining plate in such a way that the locking pin and the retaining plate transmit the clamping force across the opposite sides of the rotatable propeller blades to maintain a fixed-blade orientation of the rotatable propeller blades relative to each other in such a way that the rotatable propeller blades are rotatable about the central-rotation axis once the rotatable propeller blades are fixedly locked together; and
in an unlock position:
the rotatable propeller blades do not contact the locking pin in such a way that the locking pin and the retaining plate do not transmit the clamping force across the opposite sides of the rotatable propeller blades so that the fixed-blade orientation of the rotatable propeller blades is not maintained relative to each other in such a way that each of the rotatable propeller blades is independently rotatable about a respective instance of a spaced-apart blade-mounting axis once the rotatable propeller blades are fixedly unlocked from each other.

27. The unmanned aerial vehicle of claim 1, wherein:
in an unlock position:
a fixed-blade orientation of the rotatable propeller blades is not maintained relative to each other in such a way that each of the rotatable propeller blades is independently rotatable about a respective instance of a spaced-apart blade-mounting axis once the rotatable propeller blades are fixedly unlocked from each other; and
in a lock position:
the fixed-blade orientation of the rotatable propeller blades is maintained relative to each other in such a way that the rotatable propeller blades are rotatable about the central-rotation axis once the rotatable propeller blades are fixedly locked together; and
the clamping force is transmitted from the central-rotation axis toward the respective instance of the spaced-apart blade-mounting axis.

28. The unmanned aerial vehicle of claim 1, wherein:
each of the rotatable propeller blades include:
a proximal end defining a propeller mounting hole extending through the proximal end; and
an outer facing peripheral edge defining instances of a locking cutout being spaced apart from each other along an outer facing peripheral edge; and
the blade-lock assembly includes:
a locking taper having a shape conforming to the shape of the locking cutout; and
in the lock position, the clamping force is transmitted from the locking taper and the retaining plate toward the locking cutout provided by each of the rotatable propeller blades; and in the unlock position, the clamping force is not transmitted from the locking taper and the retaining plate toward the locking cutout provided by each of the rotatable propeller blades.

29. The unmanned aerial vehicle of claim 1, further comprising:
a propeller base defining:
a base spring pocket extending through the propeller base;
propeller mounting pins extending from the propeller base, and the propeller mounting pins being spaced apart from each other; and
mounting screw holes extending through the propeller base, and the mounting screw holes also extending through a respective instance of the propeller mounting pins, and the mounting screw holes being spaced apart from each other, and the mounting screw holes being fixedly positioned on the opposite sides of the base spring pocket.

30. The unmanned aerial vehicle of claim 29, wherein:
a retaining plate defines:
a locking pin guide hole extending through the retaining plate, and the locking pin guide hole being aligned with the base spring pocket of the propeller base; and
boss holes extending through the retaining plate, and the boss holes being fixedly positioned and being spaced apart from the locking pin guide hole, and the boss holes being aligned with a respective instance of the mounting screw holes of the propeller base.

31. The unmanned aerial vehicle of claim 30, wherein:
the blade-lock assembly includes:
a locking pin being configured to be slide receivable with the locking pin guide hole of the retaining plate; and
a locking taper being provided by the locking pin, and the locking taper having a shape conforming to the shape of a locking cutout of the rotatable propeller blades.

32. The unmanned aerial vehicle of claim 31, wherein:
in the lock position, the clamping force is transmitted from the locking taper and the retaining plate toward the locking cutout provided by the rotatable propeller blades; and
in the unlock position, the clamping force is not transmitted from the locking taper and the retaining plate toward the locking cutout provided by the rotatable propeller blades.

33. The unmanned aerial vehicle of claim 31, further comprising:
a locking spring contained, at least in part, in the propeller base, and the locking spring being interactive with the locking pin, and the locking spring being configured to provide the clamping force to the locking pin.

34. The unmanned aerial vehicle of claim 1, wherein:
each of the rotatable propeller blades defines:
a propeller mounting hole extending through a proximal end of the rotatable propeller blades, and the propeller mounting hole being configured to operatively receive a respective instance of a propeller retaining screw that extends into a respective instance of the mounting screw holes of the propeller base; and
an outer facing peripheral edge defining instances of a locking cutout being spaced apart from each and also being positioned other along an outer facing peripheral edge of the proximal end of the rotatable propeller blades, and the instances of the locking cutout being positioned proximate to the propeller mounting hole.

35. The unmanned aerial vehicle of claim 1, further comprising:
a propeller motor; and
a rotor assembly being operatively supported by the propeller motor, and the rotor assembly being fixedly coupled to the propeller base in such a way that in response to actuation of the propeller motor, the rotor assembly and the propeller base and the rotatable-propeller assembly are rotatable, and the rotatable-propeller assembly is configured to propel the vehicle.

36. The unmanned aerial vehicle of claim 35, further comprising:
a propeller arm operatively supporting the propeller motor; and
a vehicle body supporting the propeller arm.

37. The unmanned aerial vehicle of claim 1, wherein:
in a blade-storage position, the rotatable propeller blades are lockably fixedly positioned to extend parallel relative to each other in an off-line arrangement, and are spaced apart from each other, and the rotatable propeller blades are also fixedly positioned adjacent to each other in a side-by-side relationship.

38. The unmanned aerial vehicle of claim 1, further comprising:
a vehicle body extending from a hovering unmanned aerial vehicle;
the rotatable-propeller assembly is fixedly positioned relative to the vehicle body; and
the blade-lock assembly is fixedly positioned relative to the vehicle body.

39. The unmanned aerial vehicle of claim 1, wherein:
for the case where the propeller blades are not locked in a storage position, and the propeller blades are urged into a deployed position, the propeller blades become locked, by the blade-lock assembly, in the deployed position without operator assistance.

* * * * *